United States Patent
DeHart

(10) Patent No.: US 11,453,011 B1
(45) Date of Patent: Sep. 27, 2022

(54) PRODUCTION OF ALTERNATIVE SUPPLEMENTAL CEMENTITIOUS MATERIAL FROM UNCURED CONCRETE MADE WITH PORTLAND CEMENT

(71) Applicant: Michael Robert DeHart, Seabrook, TX (US)

(72) Inventor: Michael Robert DeHart, Seabrook, TX (US)

(*) Notice: Subject to any disclaimer, the term of this patent is extended or adjusted under 35 U.S.C. 154(b) by 0 days.

(21) Appl. No.: 17/678,284

(22) Filed: Feb. 23, 2022

Related U.S. Application Data

(62) Division of application No. 17/463,954, filed on Sep. 1, 2021, now Pat. No. 11,325,135.

(51) Int. Cl.
| | |
|---|---|
| B03B 9/06 | (2006.01) |
| B28C 5/42 | (2006.01) |
| B28C 5/08 | (2006.01) |
| B03B 5/56 | (2006.01) |

(52) U.S. Cl.
CPC .......... *B03B 9/063* (2013.01); *B28C 5/0875* (2013.01); *B28C 5/4237* (2013.01); *B28C 5/4244* (2013.01); *B03B 5/56* (2013.01)

(58) Field of Classification Search
CPC ......... B03B 9/063; B03B 5/56; B28C 5/0875; B28C 5/4237; B28C 5/4244
USPC ........................................ 366/53–63, 68, 187
See application file for complete search history.

(56) References Cited

U.S. PATENT DOCUMENTS

| | | | | |
|---|---|---|---|---|
| 3,596,759 | A | * 8/1971 | King ..................... | B03B 9/063 106/713 |
| 4,154,671 | A | * 5/1979 | Borges ................... | B01D 21/06 210/523 |
| 5,127,740 | A | * 7/1992 | DeBoer ................ | B28C 7/0053 366/15 |
| 5,268,111 | A | * 12/1993 | Metz ..................... | B03B 9/063 210/194 |
| 6,000,645 | A | * 12/1999 | Preisser ................. | B07B 1/22 241/79.3 |

(Continued)

FOREIGN PATENT DOCUMENTS

| | | | |
|---|---|---|---|
| WO | 01/87489 | A1 * | 11/2001 |
| WO | 2013/179122 | A1 * | 12/2013 |
| WO | 2020/030729 | A1 * | 2/2020 |

*Primary Examiner* — Charles Cooley
(74) *Attorney, Agent, or Firm* — Jeffrey Streets; Madan Law PLLC

(57) ABSTRACT

A method and apparatus for producing liquified Alternative Supplemental Cementitious Material (ASCM) from an uncured concrete slurry. Uncured concrete slurry is received into a receiving hopper, diluted with water, and pumped upward through a slurry discharge conduit to an aggregate separator that screens the gravel and sand for separate discharge. The remaining ASCM entrained water flows into a holding tank. The ASCM settles to the lower portion of the holding tank. The holding tank stores the remaining water for re-use diluting uncured concrete slurry. The ASCM is liquified and moved towards the ASCM discharge port by an agitator system located in the bottom of the holding tank. From the discharge, a pump delivers the liquified ASCM through a conduit for discharge. The discharged ASCM can be used as a partial replacement for Ordinary Portland Cement and as an ingredient in flowable fills.

19 Claims, 10 Drawing Sheets

(56) References Cited

U.S. PATENT DOCUMENTS

| | | | | |
|---|---|---|---|---|
| 8,080,111 B1* | 12/2011 | Abney | ............... | B03B 9/063 |
| | | | | 134/10 |
| 11,325,135 B1* | 5/2022 | DeHart | ............... | B28C 5/0875 |
| 2017/0312755 A1* | 11/2017 | Marchesini | ............ | B03B 9/063 |

* cited by examiner

PRODUCTION OF ALTERNATIVE SUPPLEMENTAL CEMENTITIOUS MATERIAL FROM UNCURED CONCRETE MADE WITH PORTLAND CEMENT

CROSS-REFERENCE TO RELATED APPLICATIONS

This application is division of U.S. Non-Provisional patent application Ser. No. 17/463,954 filed on Sep. 1, 2021, which application is incorporated by reference herein.

BACKGROUND

The present disclosure relates to methods and apparatus for processing uncured concrete discharged from a concrete mixer truck or from other sources to yield an Alternative Supplementary Cementitious Material (ASCM).

BACKGROUND OF THE RELATED ART

Concrete is a manufactured substance made from coarse aggregates such as gravel, fine aggregates such as sand, water, and binding ingredients. Concrete cures over time to form an increasingly hard and durable material. Portland cement is the primary binding ingredient used in the manufacture of concrete. The production of one ton of Portland cement results in the release to the atmosphere of approximately one ton of carbon dioxide. In 2019, 4.1 billion tons of Portland cement were produced in the world, including 88 million tons produced in the United States. Approximately 8% of the carbon dioxide released into the atmosphere by human activity results from the manufacture of Portland cement. Both the Portland cement industry and concrete manufacturers have funded considerable research to find ways to reduce the content of Portland cement in concrete.

After a concrete mixer truck has delivered a load of concrete to a job site, the drum of the mixer truck will often contain an amount of waste concrete. The uncured waste in the mixer truck is usually brought back to the concrete plant site and discharged into a pit, onto the ground, or into a portable metal container. Ultimately, the waste concrete storage facility becomes full. The cured waste concrete is carried off from the concrete batch plant site and delivered to a waste concrete processing operation. Some concrete manufacturing operations use an aggregate crushing machine at their plant site to convert the waste concrete into salable road base.

BRIEF SUMMARY

Some embodiments provide an apparatus for producing a liquified ASCM from an uncured concrete slurry. The apparatus comprises a receiving hopper disposed to receive uncured concrete slurry from a chute of a concrete mixer truck and a water distribution manifold disposed in the receiving hopper containing one or more water jets for diluting the uncured concrete slurry with water, a water outlet for servicing an overhead water supply, and a clarified water inlet. The apparatus further comprises a slurry pump for removing the diluted uncured concrete slurry from the receiving hopper and propelling the diluted uncured concrete slurry upward through a slurry discharge conduit, and an aggregate separator having a slurry receiving port coupled to the slurry discharge conduit for receiving the watery aggregate slurry, one or more baffles disposed under the slurry discharge port for detaining the diluted uncured concrete slurry, and an inclined screen having openings that only allow fine aggregate and ASCM entrained water to pass downward through the inclined screen and directs the discharge of coarse aggregate from the aggregate separator. The apparatus still further comprises a fluid detaining structure joined to an inclined screw conveyor extending upward from a bottom of the fluid detaining structure to a height above the fluid detaining structure, and a sluiceway extending laterally from the fluid detaining structure, wherein the fluid detaining structure is below the inclined screen to receive the fine aggregate and the ASCM entrained water that passes downward through the inclined screen, and wherein the inclined screw conveyor receives the settled fine aggregate that settles to the bottom of the fluid detaining structure and moves the fine aggregate up the inclined screw conveyor to dewater and to discharge the fine aggregate. The apparatus additionally comprises a holding tank disposed directly below a discharge end of the sluiceway to receive the ASCM entrained water from the fluid detaining structure, wherein the ASCM settles to the lower portion of the holding tank and an agitator system located at the bottom of the holding tank liquifies the settled ASCM and moves the liquified ASCM towards an ASCM discharge port, and an ASCM pump having an inlet in fluid communication with the holding tank and a discharge for supplying the liquified ASCM through a ASCM pump discharge conduit.

Some embodiments provide a method comprising receiving uncured concrete slurry into a receiving hopper, vigorously treating the uncured concrete slurry with large quantities of pressurized water, pumping the diluted uncured concrete slurry from the bottom of the receiving hopper where the diluted uncured concrete becomes a watery aggregate slurry as it is propelled upward by the slurry pump, separating coarse aggregate out of the watery aggregate slurry, after the coarse aggregate has been separated out of the watery aggregate slurry, enabling the fine aggregate to settle out of ASCM entrained water, providing a sluiceway to provide a means for the ASCM entrained water to flow from the fluid detaining structure to a holding tank, after the ASCM entrained water has been received in the holding tank, allowing the ASCM to settle to the lower portion of the holding tank with clarified water stored in the upper portion of the holding tank, liquifying the ASCM using the agitator system wherein the agitator system moves the liquified ASCM towards the ASCM discharge port, and pumping the ASCM from the bottom of the holding tank through an ASCM discharge conduit while agitating the ASCM.

Some embodiments provide an apparatus comprising a shaft having an outside diameter, a pipe having an inside surface with an inside diameter that is greater than the outside diameter of the shaft, and a plurality of circular disks with a centered hole having an inner diameter equal to the outside diameter of the shaft and a perimeter edge having an outside diameter equal to the inside diameter of the pipe, wherein the centered hole of each disk is received about the shaft and welded to the shaft, and wherein each disk is received within the pipe and the perimeter edge of each disk is welded to the inside surface of the pipe.

DETAILED DESCRIPTION

Figure 1:
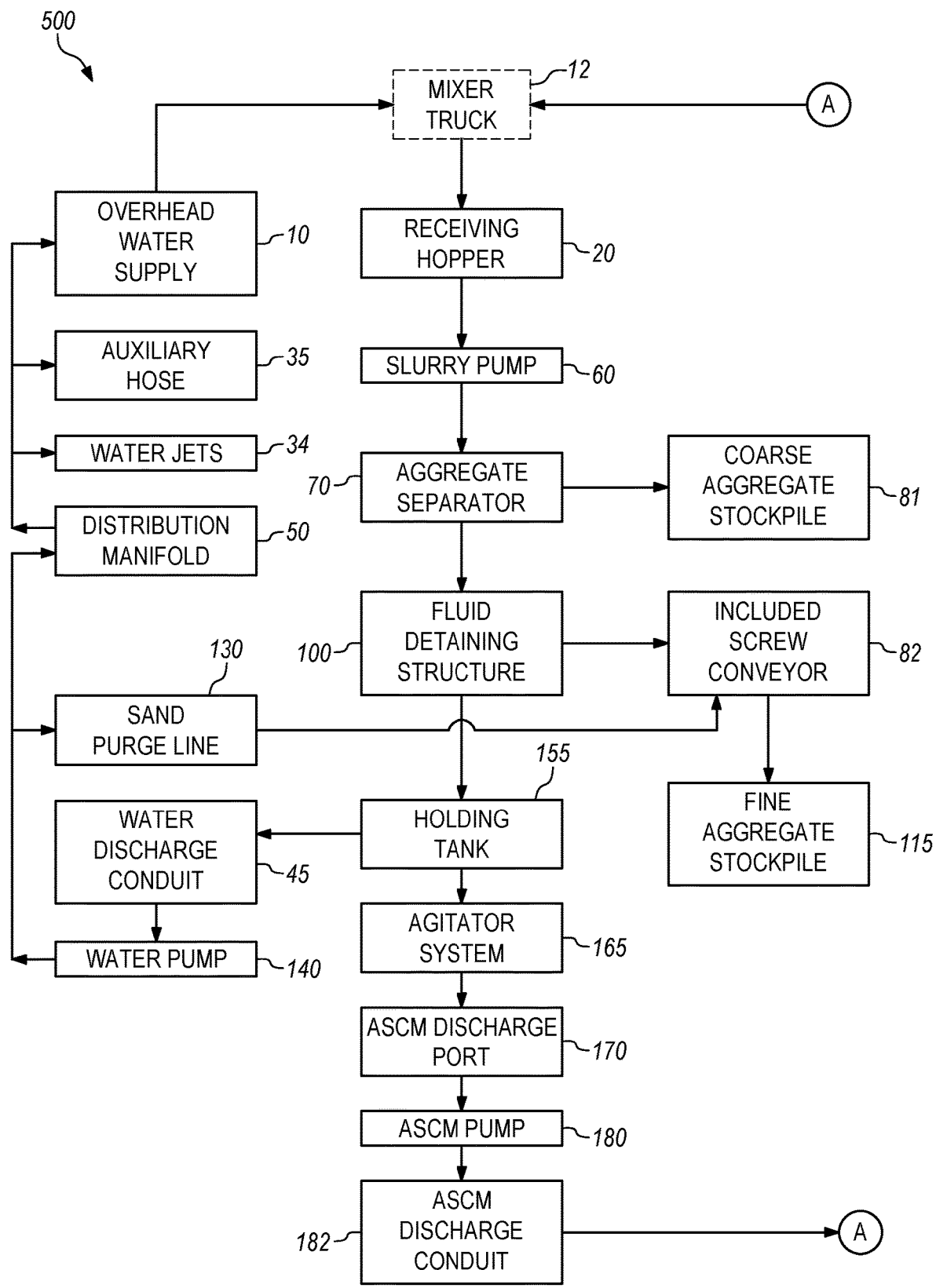
FIG. 1 is a process flow diagram for a system 500.

Some embodiments provide a method and an apparatus for producing liquified Alternative Supplemental Cementitious Material (ASCM) from an uncured concrete slurry. The ASCM consists mostly of frangible particles 5 to 20 micrometers in size that were contained in the highly diluted aggregate slurry resulting from the processing of uncured concrete. ASCM is added to the concrete mix to improve the performance of the concrete and to reduce the amount of Portland cement contained in the concrete mix. ASCM is divided into two categories: products that react with water and those that need the addition of calcium hydroxide with the water to react. The ASCM provided by the disclosure requires the addition of calcium hydroxide to react with water. Concrete made with only hydrated Portland cement as the binding agent contains about 70% calcium silicate hydrate (the active binding agent) with the remainder mostly calcium hydroxide. Calcium hydroxide is not helpful to the strength and durability of concrete. It is not a binding agent. Calcium hydroxide allows the intrusion of deleterious chemicals which ultimately can destroy the steel reinforcement in the concrete structure. The ASCM provided by the disclosure reacts with available calcium hydroxide contained in the concrete mix to make a stronger and more dense concrete requiring less Portland cement.

In some embodiments, a system comprises a receiving hopper disposed to receive uncured concrete slurry from a discharge chute of a concrete mixer truck, a fluid distribution manifold located at the upper end of the receiving hopper opposite the slurry discharge port, and a slurry pump for removing the diluted uncured concrete slurry from the bottom of the receiving hopper through the slurry discharge port, and propelling the diluted uncured concrete slurry upward through a slurry discharge conduit. The diluted uncured concrete becomes a watery aggregate slurry containing gravel, sand, and ASCM entrained water. The apparatus further comprises an aggregate separator having a slurry receiving port coupled to the slurry discharge conduit for receiving the watery aggregate slurry, a baffle(s) disposed under the slurry receiving port for detaining the watery aggregate slurry received through the slurry receiving port, and below the baffle(s), an inclined screen having openings that allow sand and ASCM entrained water to pass downward through the screen. The gravel flows over the screen and onto a gravel stockpile. Still further, the apparatus comprises a fluid detaining structure, an inclined screw conveyor attached to and extending upward to a height above the fluid detaining structure, and a sluiceway extending laterally from the fluid detaining structure. The entry point to the sluiceway establishes a maximum fluid level in the fluid detaining structure. The lower portion of the aggregate separator extends into the fluid detaining structure to slow the discharge of the sand and ASCM entrained water as it enters the inclined screw conveyor. After the sand and the ASCM entrained water exit the aggregate separator, the heavier sand settles into the screw conveyor trough. The flow of ASCM entrained water passes through the sluiceway and into a holding tank. The ASCM settles to the lower portion of the holding tank. The resulting clarified water is stored in the upper portion of the holding tank. An agitator system is installed at a bottom of the holding tank. The agitator system may be turned on to liquify the settled ASCM periodically and as ASCM is being discharged from the holding tank. The agitator system moves the liquified ASCM towards an ASCM discharge port. An ASCM pump is in fluid communication with the ASCM discharge port located at the bottom of the holding tank. The ASCM pump discharges the liquified ASCM through a ASCM discharge conduit.

Some embodiments are presented as two separate assemblies of equipment. A receiving hopper with an integral fluid distribution manifold, slurry pump, aggregate separator, fluid detaining structure, inclined screw conveyor and optionally a fluid supply pump all mounted on a skid make up the first assembly. The second assembly is a steel holding tank equipped with an agitator system, a ASCM pump, and optionally a fluid supply pump. The location of the fluid supply pump depends upon the positioning of the two equipment assemblies. These two components of the embodiment can be arranged in numerous configurations: end to end, side by side or end to side. Together they occupy the area of two concrete mixer trucks. The System 500 requires three phase electrical service and a water source to keep the holding tank full. If the System 500 is remote to the concrete batch plant, needed water is supplied by the mixer truck. In other embodiments, the water source used by the concrete batch plant is connected directly to the holding tank. The described embodiment (System 500) is the only known method and apparatus using the forceful application of large quantities of water to the uncured concrete mixture to create, isolate, store, and disburse micron sized particles that act as alternative supplementary cementitious material (ASCM). These ASCM particles on average are one-half the average size of the minerals contained in Portland cement. Over eighty per cent of the ASCM consists of oxides of calcium and silicon. Small amounts iron, aluminum, sulfur, manganese and potassium compounds make up the balance of ingredients. When this ASCM is added to concrete to replace of up to ten percent of the of Portland cement called for in the concrete mixture formula, the result is stronger and less permeable concrete. The micron-sized particles in the ASCM provide more reaction sites for the hydration of Portland cement particles. The micro sized ASCM particles react with the calcium hydroxide created during the hydration of Portland cement to form more calcium silicate hydrate. Universal use of the System 500 would reduce almost one percent of the carbon dioxide released to the atmosphere as the result of human activity. A concrete plant using the described embodiment may experience a significant profit improvement due to using ASCM to replace up to ten percent of the Portland cement and using recovered coarse aggregate (gravel) and recovered fine aggregate (sand) to manufacture new concrete.

Some embodiments provide an apparatus for producing a liquified fine ASCM sludge from an uncured concrete slurry. The apparatus comprises a receiving hopper disposed to receive uncured concrete slurry from a chute of a concrete mixer truck, a water distribution manifold disposed in the receiving hopper for diluting the uncured concrete slurry with water; and a slurry pump drawing the diluted uncured concrete slurry from along the bottom of the receiving hopper and forcing the diluted uncured concrete slurry upward through a slurry discharge conduit. The apparatus further comprises an aggregate separator having an upper port coupled to the slurry discharge conduit for receiving the diluted uncured concrete slurry, a baffle(s) disposed under the upper port for catching the diluted uncured concrete slurry received from the slurry discharge conduit, and an inclined screen having openings that allow fine aggregate and water entrained with fine ASCM to pass downward through the screen and prevent coarse aggregate from passing through the screen, wherein the coarse aggregate is discharged to a coarse aggregate stockpile. Still further, the apparatus comprises a fluid detaining structure including a reservoir, an inclined screw conveyor extending from a bottom of the fluid detaining structure to a height above the reservoir of the fluid detaining structure, and a sluiceway extending laterally from the fluid detaining structure and establishing a maximum water level in the fluid detaining structure, wherein the fluid detaining structure is directly below the inclined screen of the aggregate separator for receiving the fine aggregate and the water entrained with ASCM that passes downward through the inclined screen, and wherein the inclined screw conveyor receives the fine aggregate that settles to the bottom of the fluid detaining structure and draws the fine aggregate upward along the included screw conveyor to dewater the fine aggregate and discharge the fine aggregate to a fine aggregate stockpile. The apparatus additionally comprises a holding tank disposed directly below a discharge end of the sluiceway to receive the water entrained with ASCM from the fluid detaining structure, wherein the holding tank includes an agitator system disposed along a bottom of the holding tank, wherein the agitator is turned off to allow the ASCM to settle out of the water and is turned on to liquify the settled ASCM prior to discharge from the holding tank. The apparatus also comprises an ASCM pump having an inlet in communication with the settled ASCM sludge along the bottom of the holding tank, wherein the ASCM pump has a discharge for supplying the liquified ASCM sludge through a ASCM pump discharge conduit.

Some embodiments of the apparatus further comprise a clarified water discharge conduit penetrating the wall of the holding tank above the agitator system, and a fluid supply pump having an inlet coupled to a fluid supply suction conduit which in turn is coupled to the clarified water discharge conduit and an outlet coupled to an anti-siphon apparatus which is coupled to a fluid supply pump discharge conduit that is coupled to the manifold fluid supply port on the fluid distribution manifold. In one option, the apparatus may further comprise an overhead fluid supply conduit coupled to the fluid distribution manifold for selectively supplying the clarified water to rinse out additional uncured concrete slurry from the mixer truck. In another option, the apparatus may further comprise an anti-siphon apparatus whose anti-siphon up-flow conduit is coupled to the discharge of the fluid supply pump and the anti-siphon down-flow conduit is coupled to a fluid supply pump discharge conduit which in turn is coupled to the fluid distribution manifold in the receiving hopper. The anti-siphon apparatus is a passive device disposed at the apex of a 180-degree return bend connected to two vertical sections of anti-siphon conduit. The anti-siphon apparatus consists of a tubular valve ball enclosure, a valve ball secured within the valve ball enclosure, an upper ball seat that forms a temporary seal when the valve ball is pressed against the upper ball seat by fluid pressure in the anti-siphon up-flow conduit, and a circular lower valve seat with a diameter smaller than the valve ball. The upper valve seat is a circular opening centered in the valve ball enclosure cap. The upper valve seat has a diameter smaller than the valve ball. The lower valve seat is surrounded by a plurality of vent holes arranged in a circle around the lower valve seat and internal to the inside diameter of the valve ball enclosure. The vent holes allow air into the 180-degree return bend when the fluid pressure in the anti-siphon up-flow conduit is insufficient to keep the valve ball pressed against the upper ball seat.

In some embodiments of the apparatus, the fluid detaining structure has two opposing sidewalls and an end wall, wherein the two opposing sidewalls extend upward from opposing top edges of the screw conveyor trough and diverge away from each other with distance above the top edges of the screw conveyor trough, wherein the end wall is connected to the lower end of the screw conveyor trough and to the two opposing sidewalls, and wherein the end wall extends upward at an angle away from the screw conveyor trough. The two opposing sidewalls may form a generally horizontal rim, and the sluiceway may extend laterally from an upper edge of the end wall at an elevation below the generally horizontal rim to establish the maximum water level in the reservoir below the horizontal rim. In one option, the sluiceway may have a width as wide as the upper edge of the end wall. Alternatively, the sluiceway may extend from either side wall of the fluid detaining structure, depending upon the location of the holding tank. In a further option, the upper edges of the end wall and both sidewalls of the fluid detaining structure may be extended vertically to increase the capacity of the water detaining structure and provide a greater residence time for the fine aggregate to settle into the screw conveyor trough.

In some embodiments, the slurry discharge conduit may have a diameter that is greater than a diameter of a discharge port of the slurry pump, wherein the greater diameter of the slurry discharge conduit causes a velocity of the watery aggregate slurry (diluted uncured concrete slurry) in the slurry discharge conduit to be slower than a velocity of the diluted uncured concrete slurry through the discharge port of the slurry pump. In one option, the baffle(s) contained in the aggregate separator may have a width that slows down the flow of the diluted uncured concrete slurry over the baffle and across the inclined screen to a velocity that is less than the velocity of the watery aggregate slurry within the slurry discharge conduit.

In some embodiments, the agitator may be a mixing screw. A preferred agitator may include two or more mixing screws.

In some embodiments, the slurry pump, the inclined screw conveyor, the ASCM pump, the fluid supply pump, and the agitator system may each controlled by through an instrumentation panel or controller. In one option, the instrumentation panel may periodically turn on the agitator system for a set period of time, such as at least a few minutes every six hours.

Some embodiments provide a method comprising receiving uncured concrete slurry into a receiving hopper, diluting the concrete slurry with water, pumping the diluted uncured concrete slurry from the bottom of the receiving hopper and forcing the diluted uncured concrete slurry upward through a slurry discharge conduit. The method further comprises separating coarse aggregate out of the diluted uncured concrete slurry and, after the coarse aggregate has been separated out of the diluted concrete slurry, allowing fine aggregate to settle out of water entrained with ASCM. Still further, the method comprises allowing water entrained with ASCM to flow over a sluiceway to a holding tank disposed directly below a discharge end of the sluiceway and, after the water entrained with ASCM has been received in the holding tank, allow the water entrained with ASCM to separate out into ASCM at the bottom of the ASCM setting tank and clarified water at the top of the holding tank. The method additionally comprises agitating the ASCM to liquify the settled ASCM, moving the ASCM towards the ASCM discharge port, and pumping the ASCM from the bottom of the holding tank through a ASCM discharge conduit while the ASCM is being agitated.

Some embodiments of the method may further comprise using the clarified water from the upper portion of the holding tank to dilute the uncured concrete.

Some embodiments of the method may further comprise discharging a known amount of the ASCM through the ASCM pump discharge conduit into a mixer truck, and preparing a batch of concrete in the mixer truck. The batch of concrete may include an amount of coarse aggregate, an amount of fine aggregate, an amount of water, and an amount of Portland cement, wherein the amount of ASCM discharged into the mixer truck replaces up to 10 weight percent of the Portland cement that would otherwise be included in the batch of concrete.

In some embodiments, other sources of aggregate, Portland cement, and/or uncured concrete may be input to the receiving hopper and processed through the system. Accordingly, the system will separate out the large aggregate such as gravel, separate out the small aggregate such as sand, and accumulate the aqueous ASCM. The large aggregate, small aggregate, and ASCM may then be reused in a new batch of concrete slurry.

The apparatus of system may be scaled according to the anticipated load of uncured concrete slurry. However, some embodiments of the system may be rather compact and portable. For example, a suitable system may occupy about the same amount of area as two mixer trucks. Other than electrical and water service, no facilities may be needed to run the apparatus or system. In one option, the mixer truck may deliver water or the batch plant water supply may be connected to the holding tank.

Some embodiments of the apparatus or system may be mounted to one or more platforms, such as a trailer, a shipping container, and/or a skid. Some embodiments may be sufficiently mobile to be moved regularly from site to site, whereas other embodiments may only be intended to be installed at one site. For example, the apparatus or system may be fully manufactured on a pair of skids that may be delivered to a concrete plant site where the apparatus or system will more or less remain for regular use in support of the concrete plant site and the concrete mixer trucks that supply uncured concrete slurry to various remote construction sites. The system will typically only require an electrical connection to run the motors that drive the pumps, screw conveyors, and agitator system.

In some embodiments of the method and apparatus, the produced ASCM can be used in the preparation of subsequent batches of new concrete slurry. In some embodiments, the ASCM may have a dimension distribution of 5 to 30 microns.

The Receiving Hopper

Some embodiments of the receiving hopper may have a downwardly sloped floor and sloped sidewalls that narrow toward a lower end of the sloped floor. The lower end of the receiving hopper includes a slurry discharge port to a slurry pump, which elevates a diluted uncured concrete slurry to an aggregate separator that operates passively using only gravitational forces. The receiving hopper may be equipped with a water distribution manifold. In some embodiments, the water distribution manifold includes a plurality of high-velocity water jets directed along the downwardly sloped floor of the receiving hopper to mix clarified water with uncured concrete slurry dumped into the receiving hopper and to wash the uncured concrete slurry down to the discharge port. The water distribution manifold may also supply water to an overhead water supply conduit that may be used to run water through a mixer truck, and an auxiliary hose that may be used to wash the mixer truck discharge chute and any accumulated uncured concrete slurry down to the slurry discharge port. The receiving hopper may include a grate covering the top of the receiving hopper where the openings in the grate are sized to prevent the passage of objects that are too large for the slurry pump.

Once the slurry pump, water pump, and screw conveyor are operating, the systems status indicator notifies the truck driver ("user") to begin adding clarified water from the overhead fluid supply conduit into the mixer truck drum. The user may open an overhead fluid supply valve on the overhead fluid supply conduit to discharge the water into the mixer drum. With sufficient water in the drum, the driver closes the overhead fluid supply valve.

The user may then begin discharging a diluted uncured concrete slurry into the receiving hopper. The water distribution manifold is preferably installed in the receiving hopper. The water distribution manifold may supply water to the overhead water supply conduit, the auxiliary water supply hose, and a plurality of water jets positioned within the receiving hopper and directed to forcefully discharge water down the sloped floor of the receiving hopper. A hopper floor baffle is disposed across the sloped floor of the receiving hopper. The hopper floor baffle interrupts the downward flow of diluted concrete slurry to provide a more thorough mixing action in the receiving hopper. A fluid supply pump able to deliver water with a discharge pressure of at least thirty pounds per square inch (psi) and a discharge volume of at least 300 gallons-per-minute may be connected to the fluid distribution manifold by a fluid pump discharge conduit. In some embodiments, the fluid supply pump may have an intake port connected to an upper portion of the holding tank and an outlet port connected to the fluid distribution manifold.

The uncured concrete slurry is discharged from the mixer truck chute into the receiving hopper. Optionally, the receiving hopper may be covered with a grate having openings that allow uncured concrete slurry to pass through the grate and into the receiving hopper, but prevent the entry of any oversized object into the receiving hopper. The grate may have openings that are sized to reject any object that the slurry pump would not be able to handle. If the user fails to add water to the mixer drum and the uncured concrete slurry is viscous, the uncured concrete slurry may not flow through the grate. If this happens, the user may use the auxiliary hose to wash the uncured concrete slurry through the grate, such as by manually directing the nozzle of an auxiliary hose over the uncured concrete. After the diluted uncured concrete slurry enters the receiving hopper, the diluted uncured concrete slurry is mixed with clarified water which may be delivered into the receiving hopper through one or more pressurized water jet. For example, the pressured water jets may deliver process water at a rate of about three hundred gallons per minute or more. The high volume and velocity of the clarified water flow dilutes the uncured concrete slurry and halts the hydration (curing) process. After the concrete is fully discharged from the mixer drum, the truck driver flushes the mixer drum using the overhead fluid supply conduit and then rinses the mixer discharge chutes using the auxiliary hose supply. The water used for these flushes and rinses in the mixer truck and the receiving hopper is preferably clarified water that is recovered from previous batches of uncured concrete slurry that have been processed through the apparatus or system, such that the amount of clarified water in the system is maintained. Any needed additions to the supply of clarified water may be obtained from the concrete batch plant water system or by water supplied in the drum of the mixer truck.

The Slurry Pump

A slurry pump is connected to the slurry discharge port at the bottom of the receiving hopper with a slurry suction conduit. The slurry pump draws the highly diluted uncured concrete slurry from the receiving hopper and delivers it to the top of the aggregate separator at a higher elevation than the receiving hopper. The vigorous pumping action of the slurry pump further separates the diluted uncured concrete slurry into its individual constituents and halts the hydration process. The aggregate separator is mounted above the fluid detaining structure that includes an inclined screw conveyor trough. The slurry discharge conduit between the slurry pump and the aggregate separator may have a diameter that is larger than the diameter of the slurry pump discharge in order to slow down the velocity of the watery aggregate slurry (diluted uncured concrete slurry).

The Aggregate Separator

Some embodiments of the aggregate separator include one or more horizontal baffles and an inclined screen. Watery aggregate slurry is discharged from a slurry discharge conduit into an upper portion of the aggregate separator, such that the watery aggregate slurry flows over the one or more horizontal baffles before dropping onto the inclined screen. The one or more horizontal baffles cause a further slowing of the velocity of the watery aggregate slurry and a spreading out of the watery aggregate slurry before it reaches the inclined screen. The inclined screen has openings therethrough that are sized to divide the aggregate between coarse aggregate and fine aggregate, perhaps as defined by ASTM International. The slower velocity of the watery aggregate slurry makes the separation of the large and small aggregate more effective. The coarse aggregate (gravel) that is too large to pass through the openings in the inclined screen will move across the top of the inclined screen in the direction of the downward slope assisted by gravity. Once the coarse aggregate moves beyond the inclined screen, an inclined gravel discharge chute may be used to direct the coarse aggregate away from the aggregate separator to a stockpile. For example, the inclined gravel discharge chute may be a metal slide. Optionally, the coarse aggregate may be discharged to any side of the system. The fine aggregate and water within the watery aggregate slurry flows through the inclined screen to a fluid detaining structure.

The Fluid Detaining Structure

Some embodiments of the fluid detaining structure include an open top angular structure attached to the upper edges of an inclined screw conveyor trough with a first end positioned at the bottom of the fluid detaining structure and a second end extending upward at an angle through the fluid detaining structure to discharge fine aggregate onto a sand discharge chute. The fluid detaining structure may be positioned directly under the inclined screen of the aggregate separator so that any component of the watery aggregate slurry that passes through the inclined screen will drop into the fluid detaining structure. For example, the fine aggregate (sand), and ASCM entrained water pass through the inclined screen into the fluid detaining structure. The fine aggregate (sand) is the heaviest remaining component entering the fluid detaining structure and will settle to the bottom of the fluid detaining structure where it is directed into in the screw conveyor trough by sloped walls.

A helical screw within the screw conveyor trough is coupled to a motor that rotates the helical screw to cause the fine aggregate to move upward along the inclined screw conveyor trough and above the water line in the fluid detaining structure until the sand reaches a discharge port at or near the upper end of the screw conveyor trough. The motor preferably turns the helical screw at no more than 20 rotations per minute (rpm) to allow time to de-water the fine aggregate and enable the drained water to run back down within the screw conveyor trough to the water line in the fluid detaining structure. Accordingly, the screw conveyor performs a sand dewatering function that minimizes water loss from the system. The inclined screw conveyor may, without limitation, be inclined upward at an angle between about 20 and about 45 degrees (relative to horizontal). The inclined screw conveyor is most preferably inclined at an angle of about 30-degrees. The helical screw includes a helical blade or flighting mounted on a screw conveyor pipe. The diameter of the helical blade (and the corresponding trough) may be sized to move as much sand as may be discharged by the slurry pump operating at the maximum discharge rate of the slurry pump. For example, if the slurry pump has a capacity to pump one cubic yard of diluted uncured concrete slurry per minute, then the balance of the system may be sized accordingly to process one cubic yard of concrete slurry per minute. The screw conveyor may then be sized to remove the amount of sand that is expected to be present in one cubic yard of uncured concrete slurry per minute.

When the fine aggregate reaches the discharge port of the inclined screw conveyor, the fine aggregate is discharged from the screw conveyor trough onto a sand discharge chute that is downwardly inclined to a fine aggregate (sand) stockpile for subsequent re-use in the manufacture of a new batch of concrete. In various embodiments, the sand discharge chute may be directed to either side or to an end of the system.

In some embodiments, the fluid detaining structure has two side walls and an end wall that connect to, or extend from, the screw conveyor trough. The two side walls may be flat (planar) and extend upward from opposing top edges of the inclined screw conveyor trough and diverge away from each other with distance above the top edges of the inclined screw conveyor. The end wall is connected to the first end of the screw conveyor trough and extends upward and away from the first end of the screw conveyor trough. The two side walls preferably form a generally horizontal rim. In combination with the screw conveyor trough, the two side walls and the end wall form a water-tight fluid detaining structure. While the fluid detaining structure may have the width of the screw conveyor trough along the lower edges of the sidewalls and end wall, the fluid detaining structure has a width that increases with distance above the top edge of the screw conveyor trough. The upper limit of the end wall may have the greatest width of any other portion of the fluid detaining structure and may be in fluid communication with a wide sluiceway that is positioned laterally from the fluid detaining structure toward the holding tank. Water entrained with ASCM flows slowly down the sluiceway into the holding tank.

The fluid detaining structure serves to separate the fine aggregate out of the ASCM entrained water. The fine aggregate (sand) settles to the bottom of the fluid detaining structure and is then removed by the inclined screw conveyor. The fine aggregate may be moist as it is discharged from the inclined screw conveyor and corresponding sand discharge chute, but most of the water drains out of the fine aggregate before it is discharged. The water near the water line and adjacent the wide sluiceway will move slowly over the sluiceway and will be delivered to the holding tank. This water contains a suspension of ASCM.

In some embodiments, the system may include a sand purge conduit installed at the inside upper end of the screw conveyor on the non-carrying side to provide a stream of clarified water down the screw conveyor trough to keep the fine aggregate, such as sand, from building up and impeding the flow of water down the screw conveyor. The sand purge conduit may be supplied with clarified water that has been drawn from the upper portion of the holding tank, such as the same clarified water stream that is directed to the receiving hopper fluid distribution manifold.

Some embodiments may further include safety grates covering open areas of the fluid detaining structure and the screw conveyor trough.

The Holding Tank

The holding tank has at least a portion of the tank positioned in communication with the sluiceway from the fluid detaining structure such that the overflow of water entrained with ASCM from the fluid detaining structure is delivered to the holding tank. The holding tank includes a bottom (floor), sidewalls, an agitator system, a ASCM discharge port, and a clarified water discharge conduit. The holding tank allows the ASCM entrained water to separate into an ASCM mass collecting at the bottom of the tank and clarified water in an upper portion of the holding tank. The ASCM can become very dense and firm over time as it collects in the bottom of the tank. An agitator system consisting of two or more rotating pipes, such as one pipe equipped with right-hand helixes and another pipe equipped with left-hand helixes, is positioned along the bottom of the tank where the ASCM collects. When it is desired to discharge the ASCM from the tank, the agitator is activated to liquify the ASCM and cause the ASCM to be liquified so that it will flow. Accordingly, the liquified ASCM may then be pumped out of the holding tank via a ASCM discharge port that is positioned in an end wall near the bottom of the holding tank and adjacent the agitator. The discharge port may be positioned at an opposite end of the tank from the sluiceway where the ASCM entrained water is delivered to the tank.

In some embodiments, the agitator may be a rotating mixer, such as a mixing screw. In one option, a mixing screw may have helical blades as might be found in a screw conveyor. In a rectangular holding tank, the agitator may include a pair of mixing screws. Each mixing screw may form a continuous blade or a plurality of discrete blades. Optionally, the pair of mixing screws may extend parallel to the two opposing sides of the tank, such as two long sides of a rectangular tank. Furthermore, the agitator is intended to liquify and convey the ASCM towards the discharge port.

The ASCM settles out of the water and settles to the bottom of the holding tank. This leaves clarified water above the ASCM. The clarified water with the least amount of ASCM should be near the water line at the top of the holding tank.

Some embodiments of the holding tank may include a sight glass disposed in a sidewall of the tank. The sight glass makes it possible to visibly determine the level of ASCM that has settled into the bottom of the tank. Alternatively, the depth of the ASCM may be determined by using a ladder, a measuring stick, or electronic sensors.

The holding tank is preferably tall enough to hold sufficient water to run the system and to create additional net positive suction head to assist the performance of the water pump.

The holding tank has a clarified water discharge conduit extending through a holding tank end wall and above the agitator system. The horizontal conduit allows clarified water to flow out of the holding tank to the fluid supply pump.

The sluiceway of the fluid detaining structure preferably delivers ASCM entrained water to the holding tank with little disturbance to the water already in the tank. This encourages the settlement of the ASCM. Accordingly, the discharge end of the sluiceway is preferably just above the water line.

The primary purpose of the mixing screws is to liquify the settled ASCM. However, the mixing screws may also move the settled ASCM to the end of the holding tank for removal by the ASCM pump. Over time, the settled ASCM becomes stable enough to stand on. The movement imparted by the agitator allows water to mix into the ASCM and "liquify" the ASCM to a consistency similar to that of a milkshake. The holding tank is preferably large enough to hold sufficient water to run the system and to hold two-three feet of water entrained ASCM. The ASCM becomes denser as it is allowed to set over time. As the density of the ASCM increases, more force may be required to turn the mixing screws. In one option, a timer may be used to periodically activate rotation of the screws, such as at least every six hours. In one option, the agitator may include paddles mounted on a horizontal shaft.

The ASCM Pump

The ASCM pump has an inlet coupled to the ASCM discharge port in the holding tank end wall and an outlet coupled to a ASCM pump discharge conduit that may, for example, deliver the liquified ASCM to a mixer truck.

The Fluid Supply Pump

The holding tank further includes a clarified water discharge conduit which may extend into the holding tank above the settled ASCM. A fluid supply pump has an inlet port coupled to the fluid supply pump suction conduit which in turn is coupled to the clarified water discharge conduit. Accordingly, when the water pump is turned on, the water pump ultimately supplies the clarified water into a water distribution manifold, which may also include an overhead water supply conduit and/or an auxiliary water hose.

In some embodiments, the clarified water discharge conduit is located in the wall of the holding tank under the sluiceway. The clarified water discharge conduit delivers clarified water through a fluid supply pump suction conduit to the suction of the water pump.

In some embodiments, the fluid supply pump may have a capacity of at least 300 gallons per minute with a discharge pressure of at least 30 pounds per square inch (psi).

Some embodiments may use the clarified water from the holding tank for various purposes to avoid the use of the fresh water that is typically carried on board a concrete mixer truck. Fresh water becomes process water after it comes into contact with uncured concrete slurry or residue from uncured concrete slurry. This process water typically has a pH greater than 12 and can cause burns to the skin of personnel that may get exposed to the process water.

In some embodiments, the discharge of the fluid supply pump is connected to an anti-siphon up-flow conduit that is connected at the top to an opening of a 180-degree return bend. The other opening of the 180-degree return bend is connected to an anti-siphon down-flow conduit. The height of the top of the 180-degree return bend is at least 450 millimeters above the highest water level possible in the holding tank. Furthermore, the water level in the holding tank is higher than the top edge of the receiving hopper.

Some embodiments of the system include an anti-siphon valve installed in the top of the 180-degree return bend of the parallel anti-siphon up-flow and down-flow conduits to prevent clarified water from flowing from the holding tank through the fluid supply pump and into the receiving hopper when the system is not running (i.e., all pumps and motors are turned off). This unchecked flow of clarified water could cause the receiving hopper to overflow.

In some embodiments, the anti-siphon device consists of a tubular valve ball enclosure containing a valve ball, such as a metal ball. The valve ball enclosure is mounted over a round lower valve seat installed in the top of the 180-degree return bend. The diameter of the lower valve seat is less than the diameter of the valve ball. The circumference of the lower valve seat is surrounded by a circular plurality of vent holes located within the inside diameter of the valve ball enclosure. The valve ball enclosure may include a removable valve ball enclosure cap for containment of the valve ball. The valve ball enclosure cap may include a circular upper ball seat, where the valve ball has a diameter than is greater than the diameter of the upper ball seat. With the fluid supply pump running, the valve ball is forced onto the upper ball seat to seal the valve ball enclosure. When the pump stops, the valve ball falls onto the lower ball seat and breaks the suction. The end of the anti-siphon down-flow conduit, that is at the opposite end of the 180-degree return bend, is connected to the fluid pump discharge conduit serving the receiving hopper fluid distribution manifold.

In some embodiments, the re-cycled clarified water (i.e., clarified water from the holding tank) may be used to flush the mixer drum and discharge chutes of a mixer truck. Preferably, the recycled clarified water is used instead of a fresh water source, such as the water supply that may be stored on board the mixer truck. Use of the recycled clarified water may reduce the need for the introduction of additional water into the ASCM production process.

For example, an overhead water supply may be used to dilute the returned uncured concrete slurry in the mixer drum before discharge and then to flush the drum with a large volume of water. Flushing the drum cleans out any residual concrete in a hydration (curing) stage which could affect the performance of a new batch of concrete if the residual concrete were to remain in the drum and become mixed into the new batch of concrete. If allowed, an amount of concrete slurry will cure and attach to the fins in the mixer. Any attached concrete reduces the mixing efficiency of the mixer and the amount of concrete the mixer truck can carry. Eventually, any cured concrete within the drum must be physically detached with an air chisel and removed from the drum. Furthermore, cleaning out the drum of the mixer truck with re-cycled process water may prevent the mixer driver from having to adding fresh water to the mixer truck's water tank multiple times a day.

An alternative to the anti-siphon apparatus is to include a valve in the water supply pipe coupled to the inlet or outlet of the fluid supply pump. However, the valve would have to be reliably opened prior to using the pump in order to avoid damaging the pump and the valve would have to be reliably closed as soon as the pump was turned off in order to avoid excess water flow into the receiving hopper.

The Alternative Supplemental Cementitious Material (ASCM) and its End-Uses

Some embodiments produce a liquefied ASCM with an average particle size under one millimeter (i.e., in the micron range) from an uncured concrete slurry. Processing the uncured concrete slurry to obtain the ASCM may also result in separation or production of one or more other intermediate products, such as a coarse aggregate and/or a fine aggregate component of the concrete slurry. For example, the coarse aggregate may be gravel and the fine aggregate may be sand.

Some embodiments may utilize the ASCM to replace up to ten percent of the amount of Portland cement necessary to form the concrete. A ten percent reduction in Portland cement that must be purchased for each batch of concrete may result in a significant cost reduction since Portland cement is often the most expensive ingredient in concrete. Recovery and reuse of gravel and sand from the uncured concrete waste may further reduce the cost of materials for each batch of concrete. It should also be appreciated that reusing the ASCM recovered from waste concrete slurry to replace up to ten percent of the Portland cement may result in a 10% reduction in consumption of Portland cement and a corresponding 10% reduction of carbon dioxide emissions associated with the manufacture of Portland cement.

Some embodiments may use the recovered ASCM as a flowable fill or as one ingredient of a flowable fill. Flowable fill is a liquid mortar product sold as a fill for excavations. For example, flowable fill may be prepared using the recovered ASCM as the primary ingredient. In one option, the flowable fill may further include an amount of Portland cement and/or fly ash. In another option, the water used in the flowable fill may be substantially or entirely the clarified water obtained from the ASCM production process.

Operations: Preparing the System for Use

In some embodiments, the system may be prepared for use by dis-engaging an electrical safety switch, pushing/triggering an activation button/switch, and verifying that the system is operating properly. Conversely, the system may be shutdown using the safety switch. Alternatively, for a system with infrequent use, relays can be added to the instrumentation panel, otherwise referred to as a control panel, to control the operation of the system.

In some embodiments, a mixer truck driver ("user") may start the slurry pump, water pump and screw conveyor by pushing a button. A status lights or other indicator, such as a red and/or green light or audible sound, may be used to indicate that the system is ready for use. In one option, a timer is set for a specific amount of time following activation of the system. The user must then discharge the uncured concrete slurry from the mixer drum into the receiving hopper and flush out the mixer drum before the specific amount of time elapses and the system automatically shuts down. If more time is necessary, the user may re-start the system and the timer is reset. In another option, if the system has been shut down for a preset period of time without a subsequent activation, then the system may automatically perform a flushing routine by circulating clarified water through the system and then shutting down the system. For example, the flushing routine may be performed by turning on the slurry pump and the water supply pump so that clarified water is pumped into the receiving hopper, then through the aggregate separator and into the fluid detaining structure before overflowing back into the holding tank. The system may then shut down and remain off until the next user activates the system.

Operations: Offloading Waste Uncured Concrete Slurry

In some embodiments, a mixer truck may contain a partial load of uncured concrete slurry that must be removed from the mixer truck. The amount of the waste uncured concrete may vary from load to load, for example ranging from several cubic yards or just a few cubic feet. The mixer truck may be positioned with a charging hopper under the discharge of the overhead water supply conduit. The user may then activate the system by pushing an activation button, and position the mixer truck discharge chute over the receiving hopper. Clarified water may be dispensed into the mixer drum and the concrete slurry may be discharged into the receiving hopper. The auxiliary hose may also be used to spray clarified water into the chute for cleaning and/or to wash concrete slurry from the receiving hopper cover grate. The user may turn off the system manually, or the system may continue to run for a predetermined period of time that assures that the coarse and fine aggregates have been removed and the majority of the water entrained with ASCM has made its way to the holding tank.

Operations: Discharging Alternative Supplemental Cementitious Material (ASCM)

In some embodiments, the system may discharge an amount of liquified ASCM into a mixer truck or other vessel. For example, a mixer truck may be positioned with its charging hopper under the ASCM discharge conduit. In some options, the agitator system must be activated to liquify the ASCM at the bottom of the holding tank in order for the ASCM pump to operate. For this purpose, a delay timer relay may be used to automatically start the ASCM pump after the agitator has been in operation for a few seconds.

When the liquified ASCM discharged into the mixer truck will be used in a new batch of concrete, the mixer truck must then take on additional concrete mix ingredients at the batch plant. In an alternative embodiment, the ASCM discharge conduit is connected directly to the batch weighing system included as part of the concrete batch plant, and the desired amount of liquified ASCM may be used in a new batch of concrete.

FIG. 1 is a process flow diagram for one embodiment of a system 500 for producing Alternative Supplemental Cementitious Material (ASCM) from uncured concrete made with Portland cement. A mixer truck 12 (shown in dashed lines) is not part of the system 500, but may be involved in the use of the system according to certain embodiments. The mixer truck 12 may take on clarified water from an overhead water supply pipe 10. Uncured concrete slurry and the clarified water are discharged from the mixer truck 12 to the receiving hopper 20. An auxiliary hose 35 may be used to wash out the mixer truck chute and/or wash off a receiving hopper grate, and water jets 34 may dilute and mix the concrete slurry with additional water. A slurry pump 60 pumps the diluted uncured concrete slurry from the bottom of the receiving hopper 20 to an upper portion of the aggregate separator 70.

The aggregate separator 70 has an inclined screen that separates coarse aggregate out of the diluted uncured concrete slurry and directs the coarse aggregate to a coarse aggregate stockpile 81. The remaining components of the diluted uncured concrete slurry pass through the inclined screen and drop into the fluid (water) detaining structure 100.

The fine aggregate received in the fluid detaining structure 100 settles into an inclined screw conveyor 82. The inclined screw conveyor 82 then draws the fine aggregate up the incline to a port where the fine aggregate is discharged to a fine aggregate stockpile 115. An optional water purge line 130 may direct water into the screw conveyor trough to prevent any buildup of the fine aggregate on the floor of the trough. Water that remains in the fluid detaining structure 100 after the fine aggregate is removed is entrained with ASCM. As the water level in the fluid detaining structure 100 rises above the sluiceway, water entrained with ASCM will flow over the sluiceway and into the holding tank 155.

The holding tank 155 is a large tank enabling the water entrained with ASCM that is received from the fluid detaining structure 100 to separate into ASCM solids/particulates settled on the bottom of the holding tank 155 and clarified water in the upper portion of the holding tank 155. The ASCM solids/particulates that have settled on the bottom of the holding tank 155 may be liquified by an agitator system 165 adjacent a ASCM discharge port 170 prior to discharge from the holding tank 155. The clarified water in the upper portion of the holding tank 155 is in fluid communication with a clarified water discharge conduit 45.

The output of the ASCM pump 180 is coupled to a ASCM discharge conduit 182 that supplies the mixer truck 12 with liquified ASCM.

The clarified water discharge conduit 150 supplies water to an inlet of the fluid supply pump 140. The water pump 140 then supplies pressurized water to the optional sand purge line 130 and the fluid distribution manifold 50, which is coupled to the overhead water conduit 10, the auxiliary hose 35, and the water jets 34.

Figure 2:
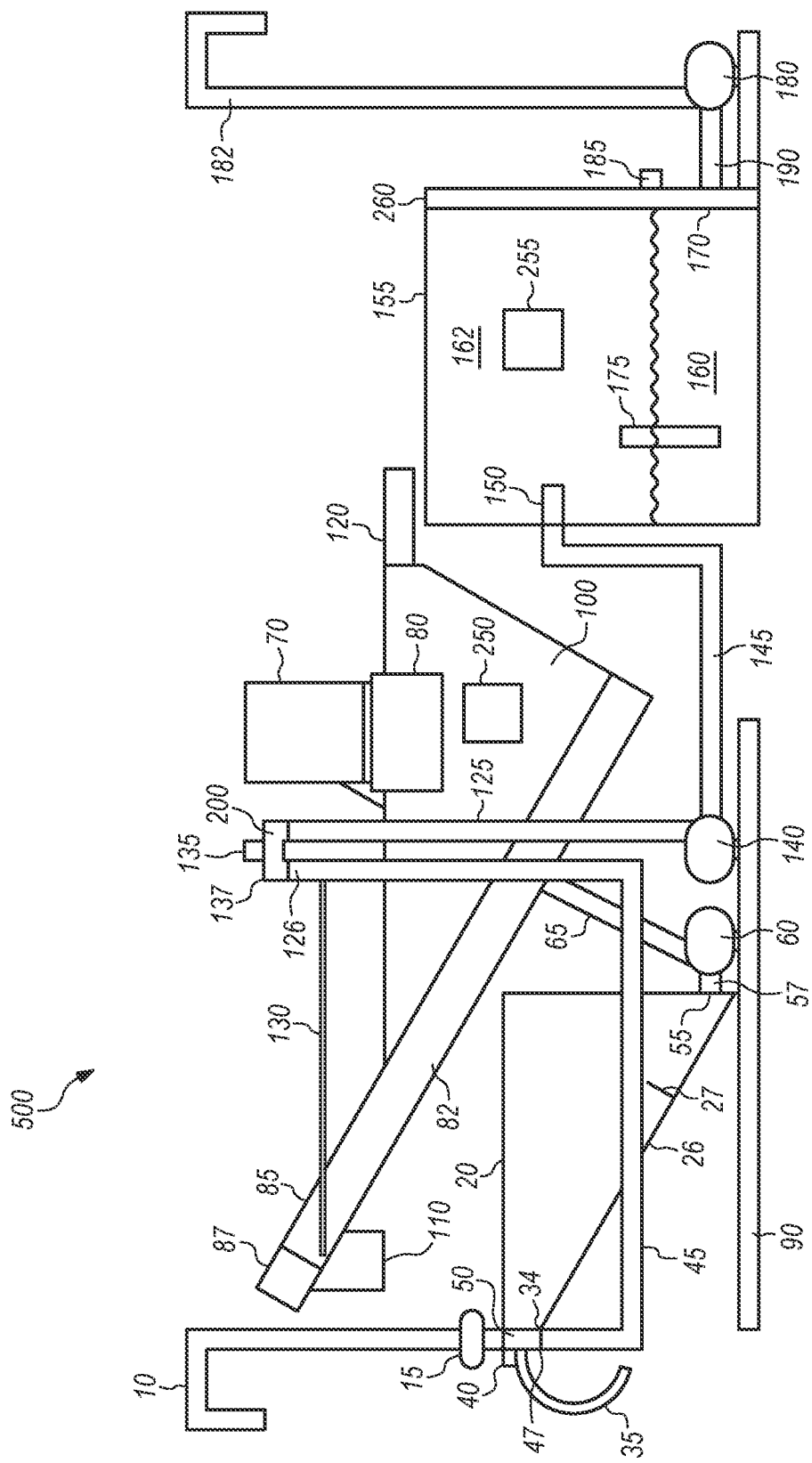
FIG. 2 is a side view of one embodiment a system 500.
Figure 3:
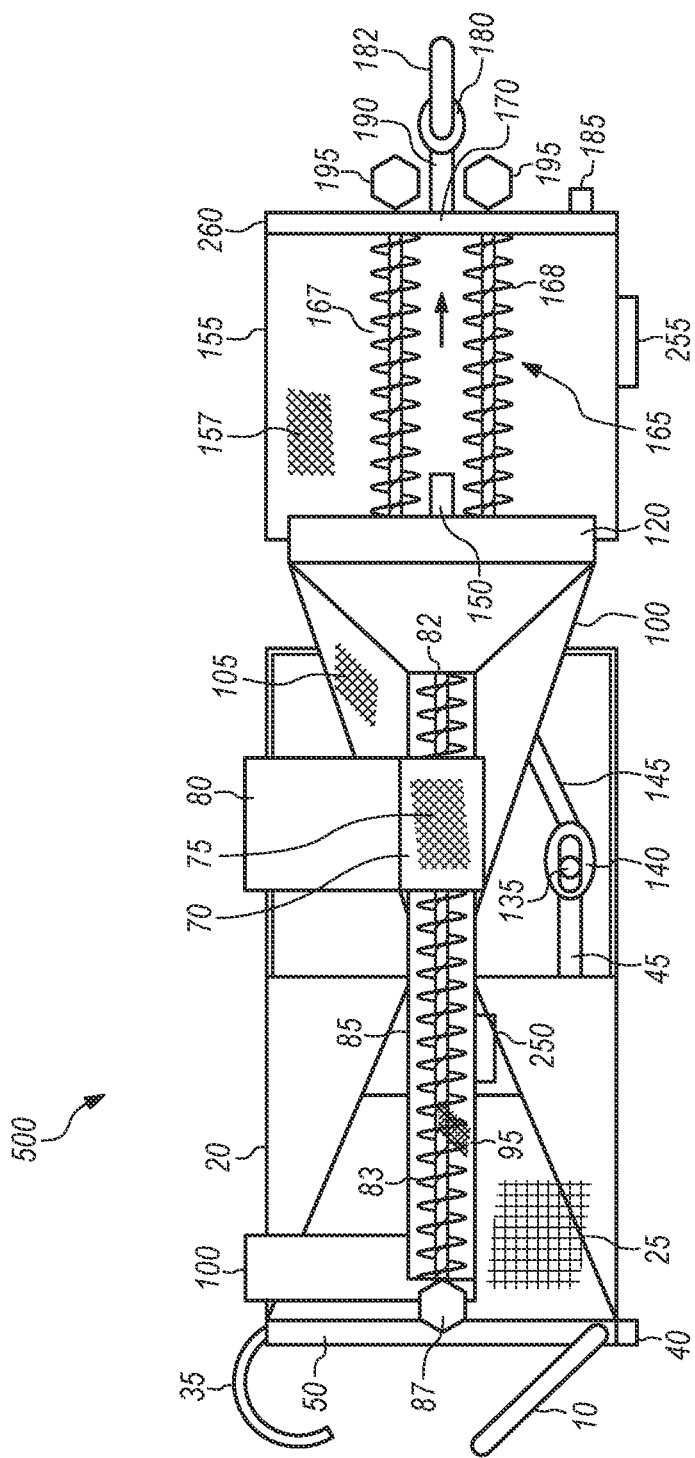
FIG. 3 is a top view of the system presented in FIG. 2.

FIG. 2 is a side schematic view of a System 500 according to the present embodiment. Many of the components discussed in reference to FIG. 2 are also shown in FIG. 3, and vice versa. The arrangement of components within this embodiment of the system 500 represents a non-limiting embodiment. This embodiment is organized into two portable equipment groupings. One grouping has the receiving hopper 20, the fluid detaining structure 100 and the inclined screw conveyor 82, the slurry pump 60, optionally the fluid supply pump 140, an instrumentation panel 250 and the related fluid containing conduit and electrical materials installed on a skid 90. The skid is fabricated of structural steel. The second grouping is comprised of a rectangular steel water/holding tank 155 equipped with an agitator system 165 (see FIGS. 3, 7A and 7B), optionally the fluid supply pump 140, an ASCM pump 180, an instrumentation panel 255, and the related fluid containing conduit and electrical materials. The location of the fluid supply pump 140 depends upon whether the groupings are installed end to end, side by side, or side to end. The two equipment groupings are sized for non-permit over the road delivery and for utilization of hot-dip galvanizing for all structural components.

In one embodiment, the slurry pump 60, the water supply pump 140, and the rotational power means 87 (see FIG. 3) may be activated at the beginning of the workday and halted at the end of the workday. The activation may be accomplished by relays or switches in the instrumentation panel 250. Alternatively, the mixer truck driver may activate the System 500 each time there is a requirement to discharge uncured concrete.

In some embodiments, to begin the System 500 at the beginning of the workday, an employee engages a starting device 40 located on or near a receiving hopper which is in electrical communication with the instrumentation panel 250. The System 500 runs throughout the workday. A status indicator (not shown) is included as part of the starting device 40. The purpose of the status indicator is to notify the mixer truck driver whether the System 500 is ready for use or not. A concrete mixer truck (not shown) may be backed to the front of a receiving hopper 20 and positioned with a charging hopper of the mixer truck (not shown) under an overhead water supply conduit 10. The driver may exit the concrete mixer truck. The driver checks the status indicator to make sure the System 500 is ready to receive uncured concrete. The driver may position a mixer truck drum discharge chute (not shown) over the top of the receiving hopper 20. The driver opens an overhead water supply valve 15 to deliver a quantity of clarified water into the mixer drum through the overhead water supply conduit 10. In some embodiments the water supply conduit may have an inside diameter of 100 mm. The mixer drum may contain up to nine cubic meters of returned uncured concrete for discharge. The driver determines how much clarified water to add to the mixer drum. The driver may rotate the mixer drum to mix the clarified water 162 with the uncured concrete to make a watery concrete slurry. The mixing action also may help keep the fins in the mixer drum from accumulating cured concrete. The mixer drum is equipped with fins oriented as a spiral. When the mixer drum turns in one direction the fins mix concrete. In the reverse rotation the fins act like an Archimedes screw to pump concrete. With mixing complete, the driver may close the overhead water supply valve 15. The driver may begin discharging uncured concrete into the receiving hopper 20 at a rate, in some embodiments, of up to one cubic meter per minute. To conserve energy, controls in the instrumentation panel may reduce motor speeds during the time periods of non-use of the System 500. The driver may use the starting device 40 to bring the System 500 motors up to processing speed. After a set time interval, the System 500 returns to an energy saving mode. At the end of the workday, the employee may shut down the System 500 by dis-engaging the starting device 40.

In some embodiments, where the System 500 is used less often during the workday, the driver may employ a starting device 40 located on or near the receiving hopper 20 to signal the instrumentation panel 250 to ready the System 500 to process uncured concrete. The starting device 40 may include a status indicator that alerts the driver of the operating status of the System 500. The driver discharges the uncured concrete per the steps above and leaves with his mixer truck. Controls in the instrumentation panel turn off the System 500 after a predetermined time interval. In some embodiments, the operating interval is thirty minutes.

In some embodiments, a fluid supply pump 140 may deliver clarified water at least three hundred gallons per minute with a pump discharge pressure of thirty PSI to a fluid distribution manifold 50 via a fluid supply pump discharge conduit 45.

Figure 4:
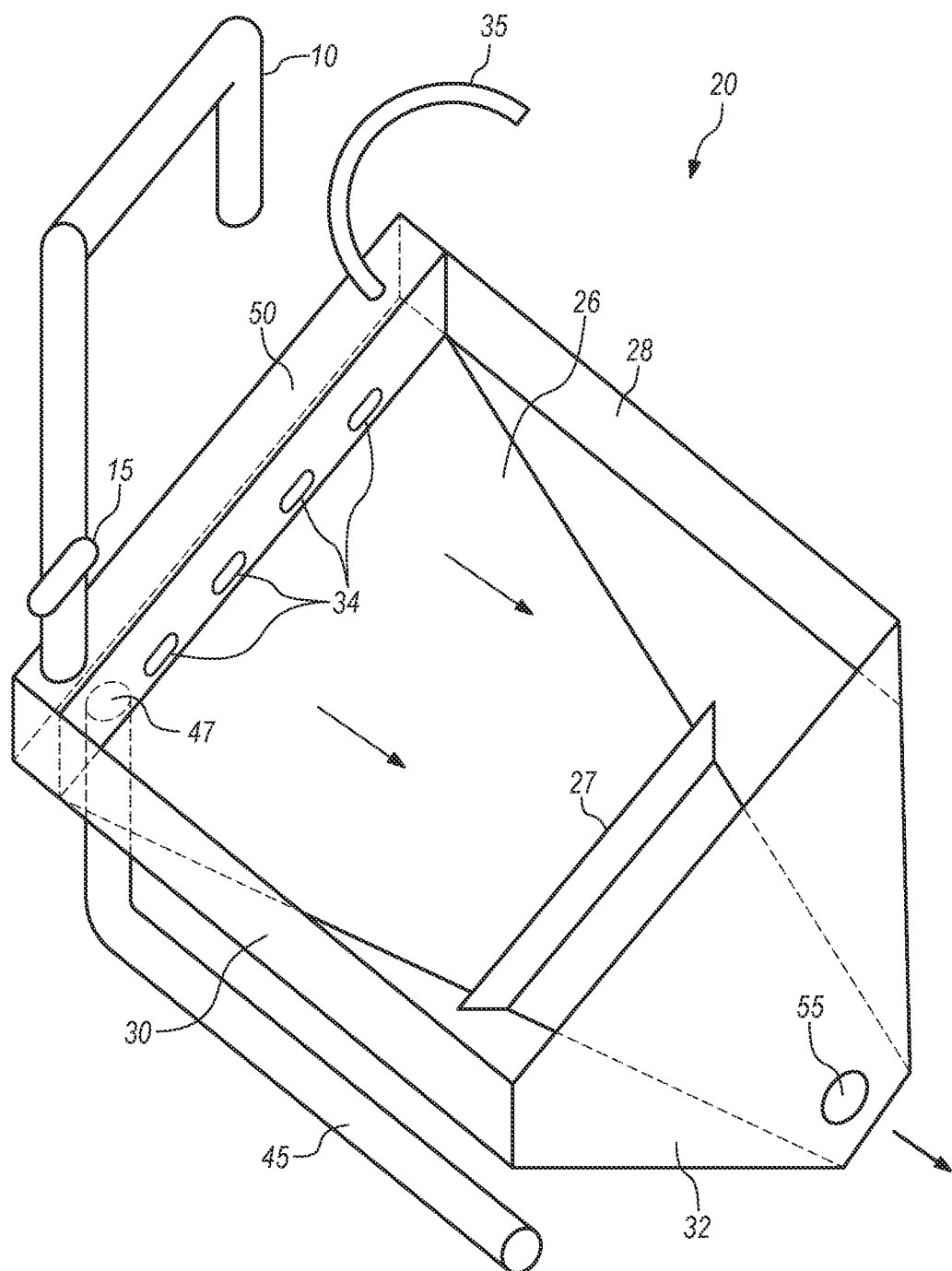
FIG. 4 is a perspective view of a receiving hopper 20.

In some embodiments a receiving hopper 20 is fabricated of steel plate and structural members (also see FIG. 4). The top edges of the receiving hopper 20 form a rectangle. At the top of the front end of the receiving hopper 20 is a fluid distribution manifold 50. The fluid distribution manifold 50 is a liquid tight steel structure holding the overhead fluid supply conduit 10, the utility hose 35, openings for a plurality of fluid jet slots 34, and an opening for a fluid supply port 47. In some embodiments the design of the receiving hopper will hold enough diluted uncured concrete to equal the discharge of the slurry pump 60 in one minute. Clarified water supplied through the fluid jet slots 34 may interact turbulently with the uncured concrete. The action of the slurry pump 60 may convert the diluted uncured concrete into a watery aggregate slurry. This watery aggregate slurry no longer contains hydratable materials. After the discharge of the uncured concrete is complete, the driver may use the overhead fluid supply conduit 10 to flush the mixer drum (not shown), and the utility hose 35 to rinse off the mixer discharge chute (not shown). The driver and the mixer truck may exit the System 500 site. The use of clarified water provided by the System 500 flush the mixer drum and to rinse the mixer drum discharge chute may eliminate the need to use water stored on the mixer truck and reduce the time spent by the driver during the workday to keep the mixer truck water tank full. If necessary, the driver may use the utility hose to fill the mixer truck water tank. Failure to flush the mixer drum after discharging the returned uncured concrete may lead to concrete hardening on the fins. Over time the concrete build up may reduce the mixing efficiency of the mixer drum and reduce the amount of concrete the mixer truck can carry. Ultimately, a person may have to enter the mixer drum through a port and use an air chisel to remove the hardened concrete.

In some embodiments a slurry pump 60 propels the watery aggregate slurry through the slurry discharge port 55, a slurry suction conduit 57 and up a slurry discharge conduit 65 and into an aggregate separator 70. The aggregate separator 70 removes the gravel from the watery aggregate slurry. The gravel is charged onto a gravel discharge chute 80. The action of the slurry pump breaks up frangible particles of ASCM and eliminates hydration of the ASCM particles in the pumped watery aggregate slurry.

In some embodiments, to slow the discharge of the watery aggregate slurry into aggregate separator 70, the slurry discharge conduit 65 has a larger diameter than the discharge of the slurry pump 60.

In some embodiments an aggregate separator 70 (also see FIG. 5) is shaped like a long steel box with no top or bottom. The upper part of the aggregate separator may extend above the upper edge of a fluid detaining structure 100. The lower portion of the aggregate separator 70 may extend into the fluid detaining structure 100 towards a screw conveyor trough 85.

In some embodiments the inclined screw conveyor 82 includes a helix, pipe, and shaft assembly 83, the screw conveyor trough 85, a screw conveyor rotational power means 87 mounted at the upper end of the helix, pipe, and shaft assembly 83 (see FIG. 3), and a bearing (not shown) at the lower end of the helix, pipe, and shaft assembly 83. The pitch and diameter of the helix and its speed of rotation may be modified to yield the helix, pipe, and shaft assembly 83 necessary to discharge in one minute the amount of sand contained in one cubic meter of uncured concrete. The metal thickness of the helixes may be sized to not fail when moving the needed volume of sand up the screw conveyor trough 85. The slow rotation of the helix, pipe, and shaft assembly 83, provides the sand residence time in the screw conveyor trough 85 to facilitate the de-watering process. At the elevated end of the screw conveyor trough 85, the sand is discharged onto the sand discharge chute 110 and then onto the sand stockpile 115 (see FIG. 6B).

In some embodiments, a sand purge line 130 provides for the flow of clarified water from a anti-siphon down flow conduit 126 to the non-conveying side of the upper end of the screw conveyor trough 85. The action of the inclined screw conveyor 30 moves the sand up on one side of the screw conveyor trough 85. Due to the slow rotation of the helix, pipe, and shaft assembly 83, some sand moves to the opposite side of the screw conveyor trough 85. This sand impedes the downward flow of water draining from the conveyed sand during the de-watering process. The clarified water delivered by the sand purge line 130 clears the opposite side of the screw conveyor trough 85 which improves the sand de-watering process.

Figure 6A:
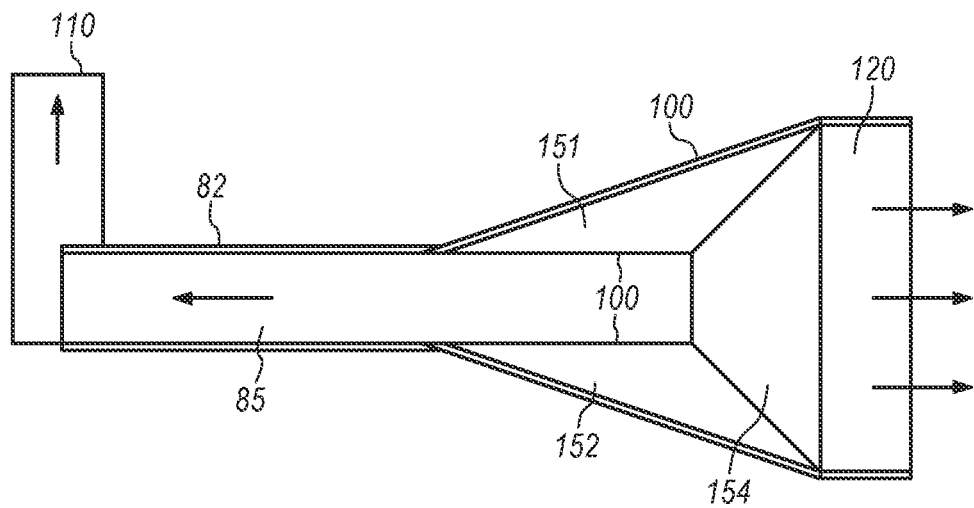
FIG. 6A is a top view of the fluid detaining structure 100
Figure 6B:
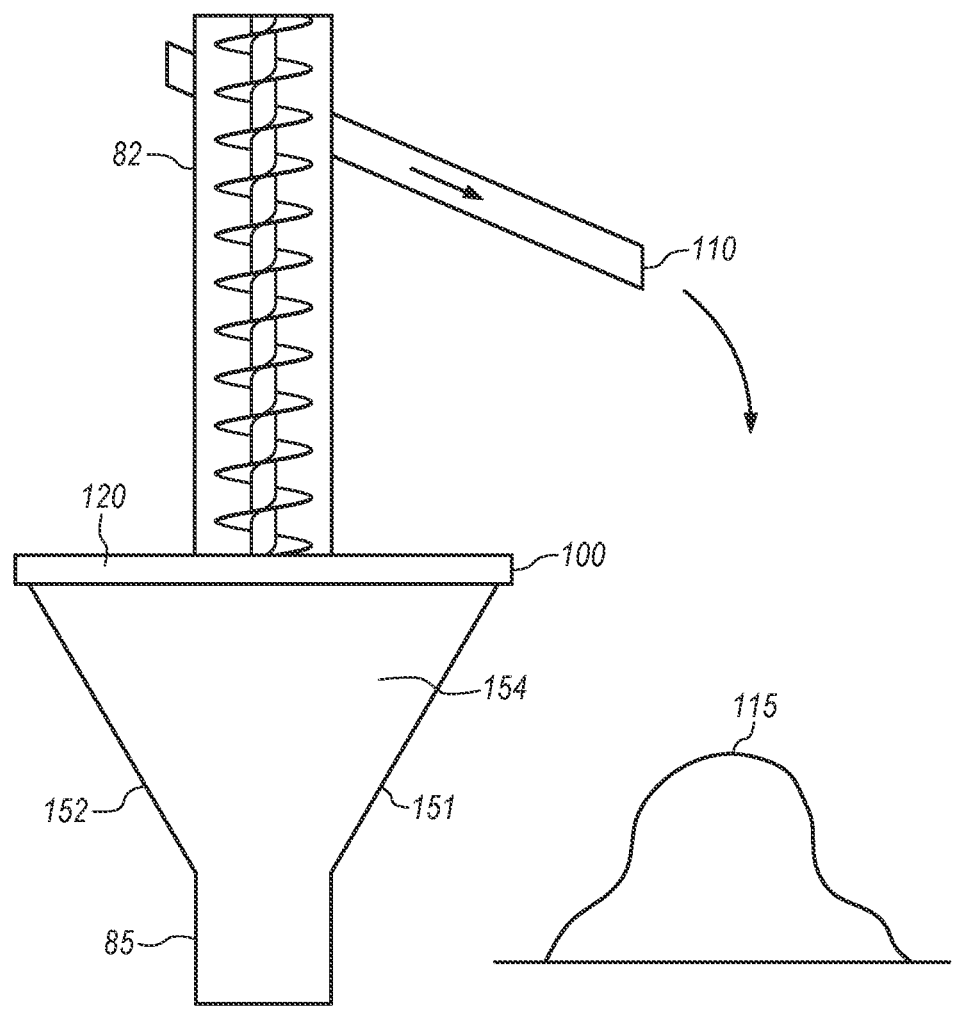
FIG. 6B is an end view of the fluid detaining structure 100.

In some embodiments the ASCM entrained water flows from the bottom of the aggregate separator 70 into the fluid detaining structure 100 (also see FIGS. 6A and 6B). The purpose of the fluid detaining structure 100 is to provide temporary storage for the ASCM entrained water as the sand settles into the screw conveyor trough 85. The sluiceway 120 may provide a means for the ASCM entrained water to flow from the fluid detaining structure 100 into the holding tank 155. The height of the floor of the sluiceway 120 determines the depth of the ASCM entrained water contained in the fluid detaining structure 100. The elements of the fluid detaining structure are fabricated of steel plate.

In some embodiments the System 500 loses clarified water through evaporation, discharge of moist gravel and sand, and removal of the liquified ASCM. In one alternative, water can be supplied to the System 500 via a conduit (not shown) from an adjacent concrete batch plant (not shown). Another alternative uses the mixer truck (not shown) to supply water (the mixer drum may hold over 7,500 liters).

In some embodiments the ASCM 160 settles to the bottom of the holding tank 155. The clarified water 162 is held in the upper portion of the water/SCM tank 155. A water supply pump suction conduit 145 is in fluid communication with a clarified water discharge conduit 150 positioned in a wall of the holding tank 155 above the settled ASCM 160. The clarified water 162 flows from the clarified water discharge port 150 through the fluid supply pump suction conduit 145 and into a suction of the fluid supply pump 140.

In some embodiments the clarified water level in the holding tank 155 is higher than the top edge of the receiving hopper 20. When the System 500 stops, clarified water 162 will siphon through the fluid supply pump discharge conduit 45 and into the fluid distribution manifold 50 and overflow the receiving hopper 20. In some embodiments, the use of an anti-siphon apparatus 200 may prevent the overflow. The anti-siphon apparatus 200 (also see FIG. 8) consists of an anti-siphon valve 135 mounted on top of a 180-degree return bend 137 which in turn is welded to the top of the vertical anti-siphon up flow conduit 125 and a vertical anti-siphon down flow conduit 126. In some embodiments the 180-degree return bend may be replaced with a conduit employing elbows to connect the anti-siphon up-flow conduit 125 and the anti-siphon down-flow conduit 126. The anti-siphon up flow conduit is in fluid communication with the discharge of the fluid supply pump 140. The anti-siphon down flow conduit 126 is in fluid communication with the fluid supply pump discharge conduit 45.

Figure 7A:
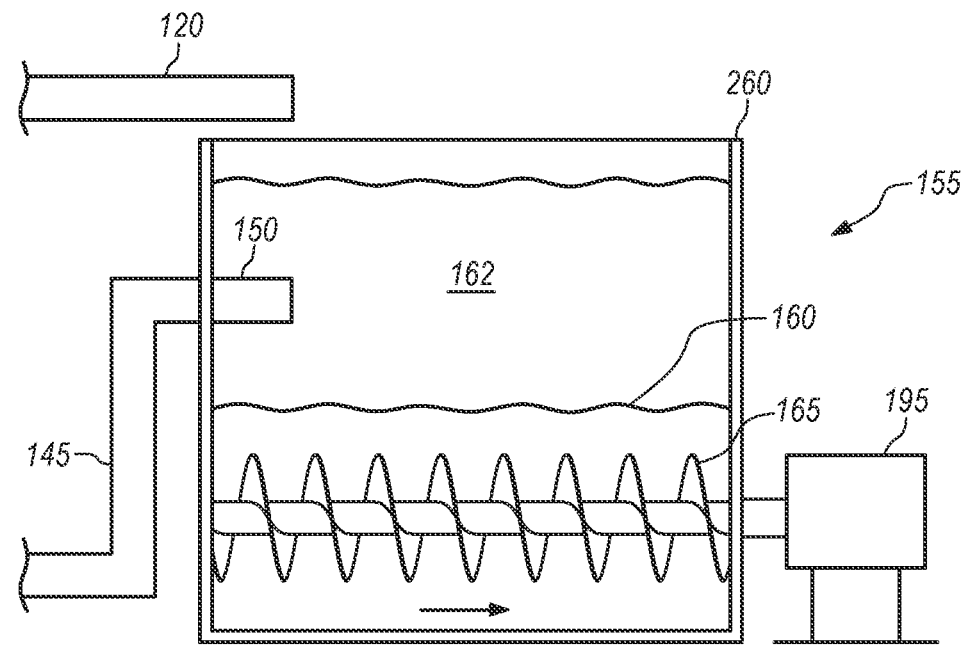
FIGS. 7A and 7B are cut-away side views of a holding tank 155.
Figure 7B:
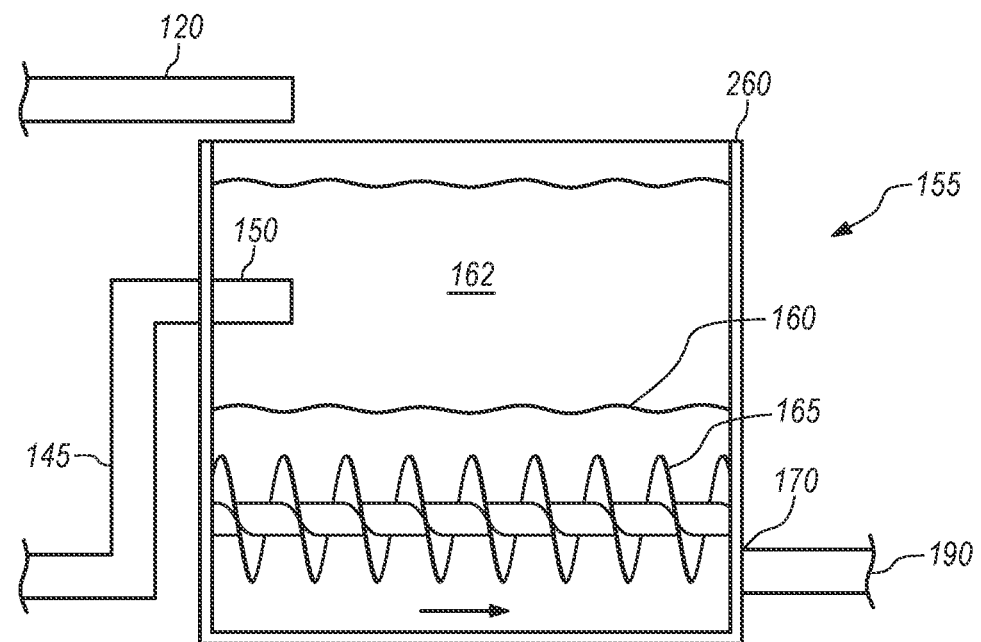

In some embodiments the portable holding tank 155 is a watertight rectangular structure with a removable door 260 (See also FIG. 3, FIG. 7A, and FIG. 7B). The removable door 260 facilitates an initial installation of the right helix, pipe and shaft assembly 167 (see FIG. 3) and the left helix, pipe, and shaft assembly 168 (see FIG. 3). The holding tank 155 may be fabricated of steel sheet, plate, and structural members. Mounted on the holding tank 155 is an agitator system 165 (not shown, see FIG. 3), an ASCM discharge port 170, a ASCM pump suction conduit 190, a ASCM pump 180, a ASCM pump discharge conduit 182 and a clarified water discharge conduit 150. In some embodiments the holding tank 155 may be equipped with a water supply pump 140. The top of a wall of the holding tank 155 is positioned under the sluiceway 120 attached to the fluid detaining structure 100. The overflow of ASCM entrained water from the fluid detaining structure 100 may be delivered to the holding tank 155 via the sluiceway 120. In some embodiments, the floor of the sluiceway 120 may be over two meters wide. The width of the sluiceway 120 slows the SCM entrained water entering the holding tank 155. Slower ASCM entrained water flow reduces disturbance in the holding tank 155 promoting more rapid settlement of ASCM.

More water depth in the holding tank 155 provides more volume to store settled ASCM 160 and clarified water 162. Deeper water depth in the holding tank 155 may improve the performance of the water supply pump 140. Increasing the clarified water 162 storage capacity of the holding tank 155 reduces the number of times the clarified water 162 stored in the holding tank 155 turns over per hour by the water supply pump 140. A slower rate of water turnover allows more time for the ASCM 160 to settle from the upper portion to the lower portion of the holding tank 155. The clarified water 162 is stored in the upper portion of the holding tank 155. Many (especially urban) concrete manufacturing plant sites have little available space. A deeper holding tank 155 may result in less square footage needed for the system.

Some embodiments a wall of the holding tank 155 may include a sight glass 175. The sight glass 175 makes it possible to visibly determine the level of ASCM 160 that has settled to the bottom of the holding tank 155. In other embodiments, the depth of the settled ASCM 160 may be determined by using a ladder to look over the top of the holding tank 155 to observe the depth of the ASCM 160 through the clarified water 162.

FIG. 3 is a top view of the system described in FIG. 2. The operation description and reference numbers are consistent for FIG. 3 and FIG. 2. FIG. 3 shows the location of safety screens in the System 500. The screw conveyor safety screen 95, the fluid detaining safety screen 105, and the holding tank safety screen 157 prevent personnel and unwanted objects from falling into the areas where screw conveyors operate. The openings of the safety screens are sized to keep out smaller objects that may interfere with the operation of the inclined screw conveyor 82 and the agitator system 165. A receiving hopper grate 25 with openings small enough to catch any items too large to pass through the slurry pump 60 (not shown; see FIG. 1) and to provide personnel safety may be installed at the top of the receiving hopper 20. To prevent overwhelming the slurry pump 60, the openings in the receiving hopper grate 25 are sized to help slow the flow of uncured concrete into the receiving hopper 20.

In some embodiments the inclined screw conveyor 82 may include the installation of a helix, pipe, and shaft assembly 83. Selection of a rotational power means 87 is based on its ability to efficiently rotate a helix pipe, and shaft assembly 83 at a certain angle in a certain material. However, the cylindrical opening for shaft insertion in the otherwise suitable rotational power means 87 may not be large enough to handle pipe with the diameter needed to provide an acceptable amount of deflection for the needed length of the helix, pipe, and shaft assembly 83.

A shaft/pipe joint 230 (not shown, see FIGS. 9A and 9B) can join a pipe with significantly larger inside diameter than the diameter of the required shaft. The helix, pipe, and shaft assembly 83 must have enough clearance over the floor of the screw conveyor trough 85 to handle, without jamming, any object that may enter the screw conveyor trough 85. Less deflection also may reduce wear on the rotational power means 87 and bearing (not shown). A screw conveyor safety screen 95 mounted over the open areas of the screw conveyor trough 85 keeps out objects larger than the clearance between the bottom of the screw conveyor trough 85 and the helix, pipe, and shaft assembly 83.

The electrical devices used to control the operation and to protect the rotating equipment are located in the instrumentation panel 250 and the instrumentation panel 255. Instrumentation panel 250 manages the operation of the slurry pump 60, the rotational power means 87 used in the inclined screw conveyor 82, and the water supply pump 140. Instrumentation panel 255 manages the operation of the agitator system 165 and the SCM pump 180.

In some embodiments an agitator system 165 (see also FIGS. 7A and 7B) may be installed in the bottom of the holding tank 155 to liquify the settled ASCM and to move the liquified ASCM towards an ASCM discharge port 170. The agitator system 165 may include a right-hand helix, pipe, and shaft assembly 167, a left-hand helix, pipe, and shaft assembly 168, a mixing power means 195 linked to one end of both the right-hand helix, pipe, and shaft assembly 167 and the left-hand helix, pipe, and shaft assembly 168, and supporting bearings (not shown). The right-hand helix, pipe, and shaft assembly 167 and the left-hand helix, pipe, and shaft assembly 168 are fabricated in the same manner as the helix, pipe, and shaft assembly 83 used in the inclined screw conveyor 82. The shafts of right-hand helix, pipe, and shaft assembly 167 and the left-hand helix, pipe, and shaft assembly 168 penetrate the walls of the tank for placement in the mixing power means 195 and bearings (not shown) mounted on the holding tank 155. The mixing power means 195 may rotate in the settled ASCM at a speed just fast enough for liquification. In some embodiments the mixing power means 195 provides a rotational speed of twenty RPM. The ASCM can become very dense and firm over time as it collects at the bottom of the holding tank 155. In some embodiments, controls contained in the instrumentation panel 255 may operate the mixing power means 195 fifteen minutes every six hours. To discharge the ASCM from the holding tank 155, the agitator system 165 is activated both to liquify and to move the ASCM towards the ASCM discharge port 170. The liquified ASCM may be pumped from the holding tank 155 through a ASCM discharge port 170 that is positioned near the bottom of the holding tank 155 in fluid communication with ASCM pump suction conduit 190, the ASCM pump 180, and at the ASCM pump discharge conduit 182. In some alternative embodiments, the agitator system 165 may use paddles mounted on a horizontal shaft.

After use of the System 500 begins, the ASCM will steadily accumulate in the lower portion of the holding tank 155. The rate at which the ASCM accumulates depends upon the amount of uncured concrete returned to the concrete manufacturing plant site. Ultimately, the ASCM will have accumulated deeply enough to cover the right helix, pipe, and shaft assembly 167 and the left helix, pipe, and shaft assembly 168. At this time, calculate the volume of settled ASCM. After initial operation of the System 500, record the number of days needed for settled ASCM to cover the top of the helix, pipe, and shaft assembles 167 and 168. This information will be useful in calculating the future amounts of ASCM available for addition to the concrete mix. Now the System 500 is ready to disburse liquified ASCM.

A dosage amount of ASCM may be determined before the ASCM is pumped into a mixer truck (not shown). The elements making up Portland cement have a specific gravity of 3.15. ASCM is made up of these elements in the form of micronized particles. The sand contained in the concrete mix contributes additional micron sized sand particles. The mineral makeup of the ASCM may be altered by the addition of fly ash and other supplementary cementitious materials to the concrete mix. Depending upon the chemistry of the other added supplementary cementitious materials and the quantity used, the specific gravity of the minerals contained in the SMC may approximate three. Over seventy percent of the mineral weight is calcium and silicon oxides. The dosage amount may be computed using algebraic equations. Discharge a sample volume of liquified ASCM into a container. Record the amount of time it took to pump the liquified ASCM into the container. Also record the amount of time from pump start to pump discharge liquified ASCM. Weigh the liquified ASCM contained in the container. Using the specific gravity of one for water and three for ASCM, calculate the amount of ASCM contained in the liquified ASCM. The remaining volume will be water. The result of using the equations will be the weight and volume of the ASCM and water in the sample volume. Determine the weight of Portland cement to be deducted from the concrete mix. The amount of ASCM to add will be a percentage of the Portland cement weight reduction. Divide the weight of ASCM to add to the concrete mix by the weight per gallon of the ASCM determined in the sample. This is the number of gallons of ASCM to add to the concrete mix. Then multiply the number of gallons of ASCM by the ratio of gallons of water to ASCM in the sample calculation. This product equals the number of gallons of clarified water 160 that will be discharged with the number of gallons of SCM. The sum of the ASCM and clarified water gallons equals the dosage to be added to the concrete mix. The gallons of clarified water will be subtracted from the total water amount in the concrete mix formula. Relay timing devices located in the instrumentation panel 255 may be used to deliver the calculated amount of liquified ASCM into the mixer truck drum. In some embodiments, the ASCM pump discharge conduit may be plumbed into the batch weighing system used in the concrete manufacturing plant. In this situation, the discharge of the liquified ASCM will be managed by the concrete manufacturing plant operator.

In some embodiments the mixer truck (not shown) is positioned with its charging hopper under the discharge point of a ASCM discharge conduit 182. The driver dismounts from the mixer truck and uses the activation device 185 to direct the instrumentation panel 255 to start the agitator system 165 fifteen seconds before starting the ASCM pump 180. The lagged starting time gives the agitator system 165 time to liquify the ASCM. The delayed start up timing also reduces the initial power demand needed to start the agitator system 165 and the ASCM pump 180. After use of the System 500 begins, the ASCM will steadily accumulate in the lower portion of the holding tank 155. The rate at which the ASCM accumulates depends upon the amount of uncured concrete returned to the concrete manufacturing plant site. Ultimately, the ASCM will have accumulated deeply enough to cover the right helix, pipe, and shaft assembly 167 and the left helix, pipe, and shaft assembly 168. While the agitator system is running, the ASCM moves towards the ASCM discharge port 170.

FIG. 4 is a perspective view of one embodiment of the receiving hopper 20. The mixer truck backs up to the end of the receiving hopper equipped with an overhead water supply conduit 10 and an overhead water supply valve 15. This end of the receiving hopper contains the water distribution manifold 50. The water distribution manifold 50 is supplied water through the water pump supply conduit 45. The water distribution manifold supplies water to the overhead water supply conduit 10, the optional utility hose 35, and a plurality of water jet slots 34. The forceful flow of clarified water through the water jet slots 34 is directed down the triangularly shaped receiving hopper floor 26 of the receiving hopper 20. In some embodiments the water distribution manifold 50 is fabricated out of rectangular steel tubing with closed ends. The outwardly inclined right receiving hopper sidewall 28 and left receiving hopper sidewall 30, slanted receiving hopper floor 26, vertical receiving hopper end wall 32, and water distribution manifold 50 complete the water-tight structure of the receiving hopper 20. The slurry discharge port 55 is centered at the bottom of the receiving hopper end wall 32. In some embodiments a hopper floor baffle 27 (see also FIG. 2) is positioned across the slanted receiving hopper floor 26. The hopper floor baffle 27 helps convert the flow of the diluted uncured concrete into a watery aggregate slurry as it reaches the slurry discharge port 55. The width of the receiving hopper floor 26 increasingly narrows as it slopes downward from the fluid distribution manifold 50 towards a slurry discharge port 55. A hopper floor baffle 27 may be installed vertically across the slope of the receiving hopper floor 26 to slow the flow of the diluted uncured concrete before it reaches the slurry discharge port 55. The bottom edges of the two sloped sides of receiving hopper 20 are wider at the fluid distribution manifold 50 end and narrower where they terminate at the wall holding the slurry discharge port 55.

Figure 5:
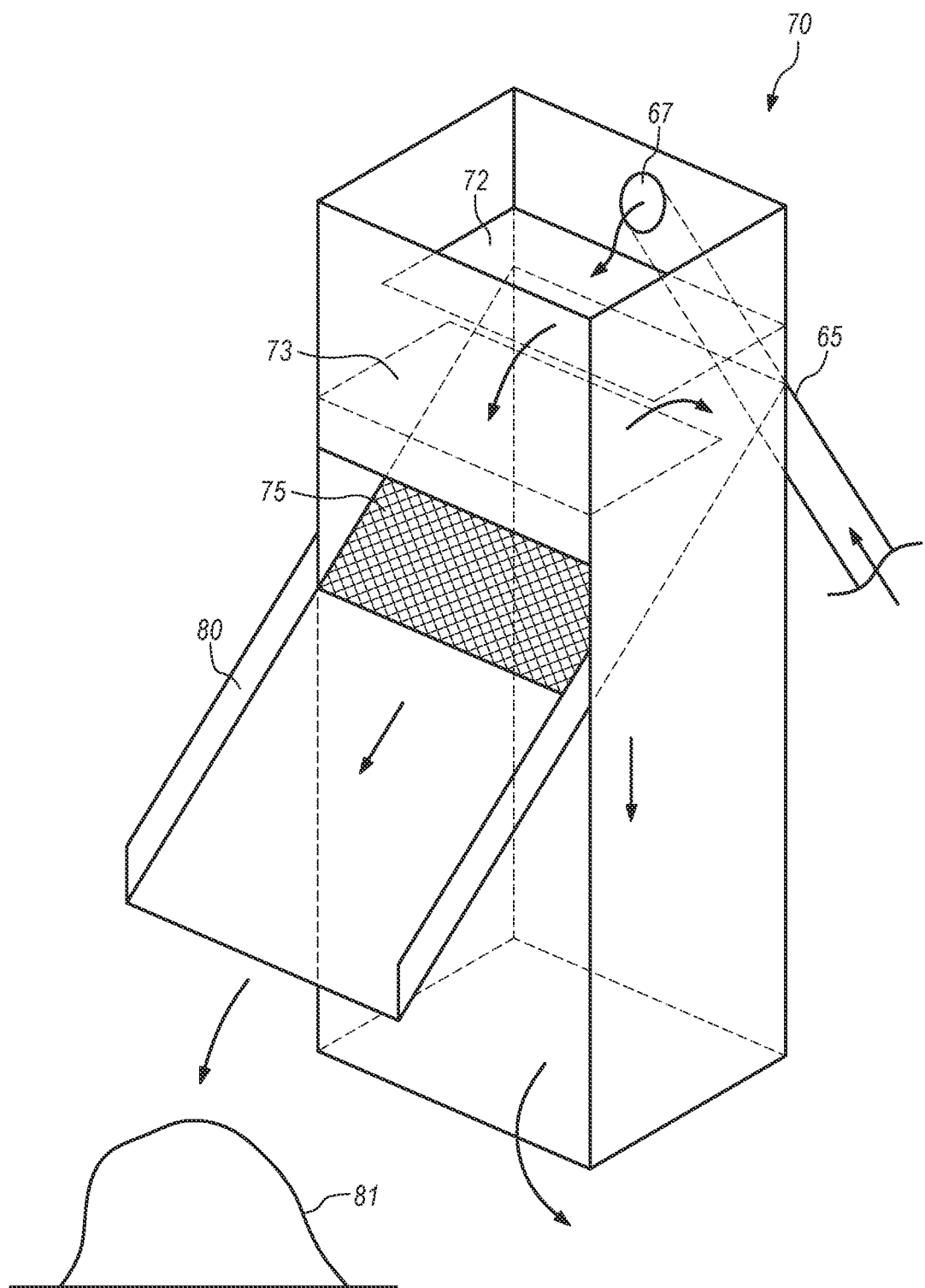
FIG. 5 is a perspective view of an aggregate separator 70.

FIG. 5 is a perspective view of one embodiment of an aggregate separator 70. Watery aggregate slurry is delivered to the aggregate separator 70 via the slurry discharge conduit 65 and through separator discharge port 67. Inside the aggregate separator 70 is upper baffle 72 and lower baffle 73 whose purpose is to spread out and to slow the flow of the watery aggregate slurry after it has entered the aggregate separator 70. Spreading out and slowing the flow of the watery aggregate slurry improves the separation of the gravel or coarse aggregate from the sand or fine aggregate as they fall onto the inclined screen 75. The upper baffle 72 directs the flow of the watery aggregate slurry to the front of the aggregate separator 70. The lower baffle 73 directs the flow of the watery slurry to the back of the aggregate separator 70 and onto an inclined screen 75. Openings in the inclined screen 75 allow the passage of sand and ASCM entrained water into the fluid detaining structure 100 (not shown; see FIG. 1). The gravel flows down the inclined screen 75 onto the gravel discharge chute 80 before falling onto the gravel stockpile 81.

FIGS. 6A and 6B are top and end views of one embodiment of a fluid detaining structure 100. The fluid detaining structure may provide time for the particles of sand larger than 40 microns to settle into the screw conveyor trough 85. FIG. 6A illustrates the connection of a right sidewall 151 and a left sidewall 152 to the top edges of the screw conveyor trough 85. An end wall 154 extends upward at right angles to the top edges of the screw conveyor trough 85. The end wall completes the closure of the fluid detaining structure 100. The outwardly angled right sidewall 151, the left sidewall 152, and the end wall 154 provide for more fluid residence time compared to vertical walls extending upward form the screw conveyor trough 85. The right sidewall 151, left sidewall 152, and end wall 154 may be welded to the screw conveyor trough 85 or otherwise sealed against water leakage. As the sand and ASCM entrained water flow into the fluid detaining structure 100, the ASCM entrained water rises and flows through the sluiceway 120. The sluiceway 120 extends laterally from a top edge of the end wall 154. In other embodiments, the sluiceway could extend laterally from either the right sidewall 151 or the left sidewall 152. The inclined screw conveyor moves the fine aggregated (sand) upwards to the fine aggregate (sand) discharge where the fine aggregate (sand) is directed to the sand stockpile 115.

FIG. 6B is an end view of the fluid detaining structure 100. The first and second sidewalls 151, 152 are shown diverging apart such that the structure is wider at the top than at the bottom. In this embodiment, the sluiceway 120 is positioned at the top of the end wall 154. To de-water the sand, the upper portion of the inclined screw conveyor 82 rises out of the ASCM entrained water contained in the fluid detaining structure 100. The sand reaching the upper end of the inclined screw conveyor 82 is discharged onto the sand discharge chute 110. The sand flows down the sand discharge chute 110 onto the sand stockpile 115.

FIGS. 7A and 7B are cross-sectional side views of one embodiment of a holding tank 155. FIG. 7A illustrates an embodiment of the operations within the holding tank 155. A sluiceway 120 may be positioned over the top edge of a wall of the holding tank 155. When the System 500 operates, ASCM entrained water flows through the sluiceway 120 into the holding tank 155. The clarified water discharge conduit 150 enables clarified water 162 to flow from the holding tank 155 into the water supply pump suction conduit 145. The ASCM 160 settles to the lower portion of the holding tank 155. The clarified water 162 accumulates in the upper portion of the holding tank 155. In the current embodiment an agitator system 165 may be installed at the bottom of the holding tank 155. The agitator system 165 consists of a right helix, pipe, and shaft assembly 167, a left helix, pipe, and shaft assembly 168, and two mixing power means 195. The shafts of both helix, pipe, and shaft assemblies 167 and 168 penetrate the holding tank 155 walls to be supported at each end by a bearing (not shown). In some embodiments the agitator system 165 mixes the settled ASCM 160 15 minutes every six hours to maintain the pumpability of the settled ASCM 160.

FIG. 7B presents the same view as FIG. 7A with the mixing power means 195 replaced by the ASCM discharge port 170 and the ASCM pump suction conduit 190. When the agitator system 165 operates, the rotating helix, pipe, and shaft assemblies 167 and 168 liquify the settled ASCM 160. The effect of the opposite pitches of the helix, pipe, and shaft assemblies 167 and 168 is to move the liquified ASCM 160 towards the ASCM discharge port 170. The ASCM discharge port 170 located at the bottom center of the removable door 260 is in fluid communication with the ASCM pump suction conduit 190.

Figure 8:
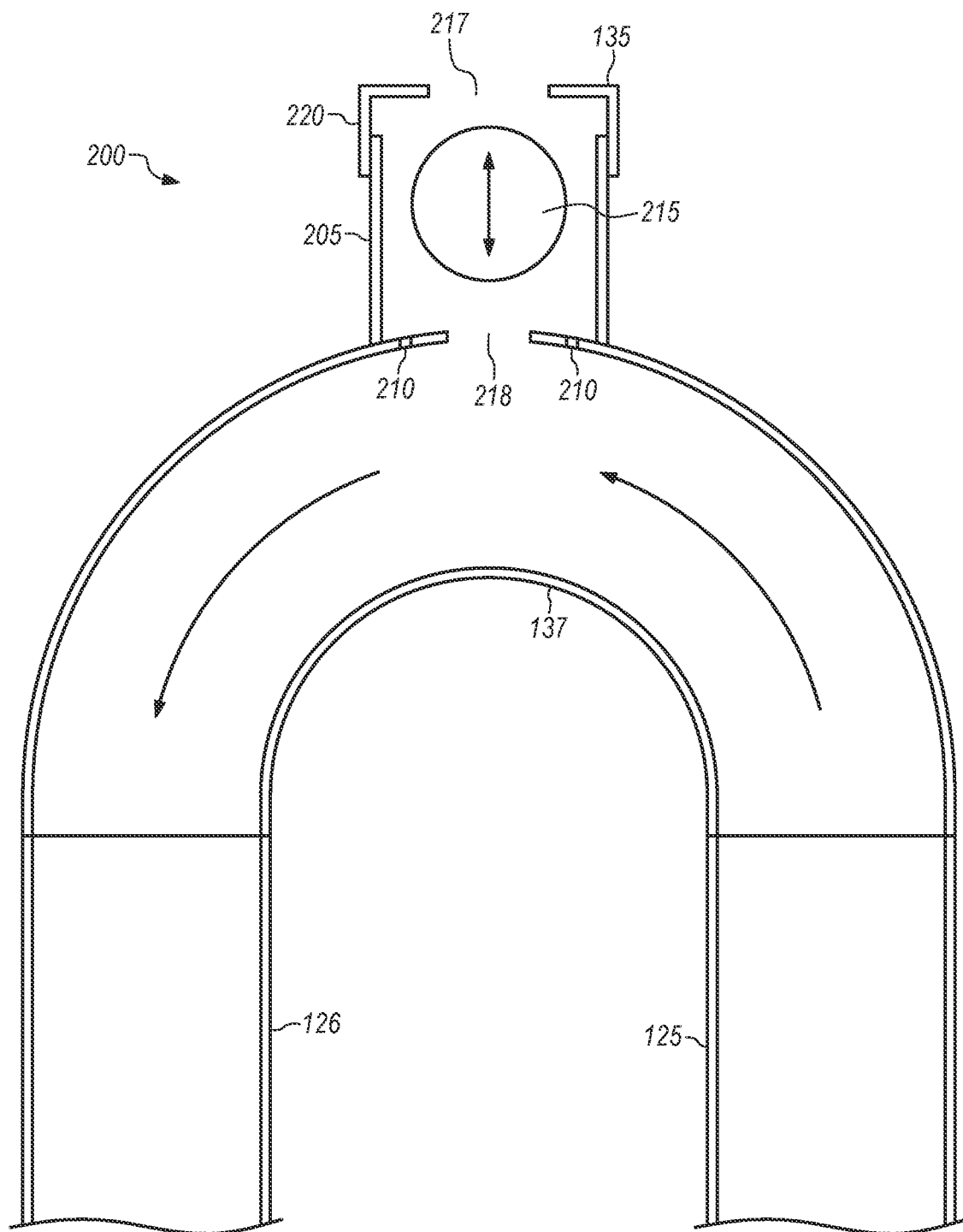
FIG. 8 is a sectional view of an anti-siphon apparatus 133.

FIG. 8 is a cross-sectional view of an anti-siphon apparatus 200. An anti-siphon apparatus 200 is used when two or more open top tanks are connected by conduits, and one or more of the tanks has a fluid depth greater than the other tanks. The anti-siphon apparatus installed with the conduits connecting the tanks prevents the unwanted flow of fluid among the tanks. The anti-siphon apparatus 200 consists of a vertically disposed anti-siphon up flow conduit 125. The top end of the anti-siphon up flow conduit 125 terminates at an end of the 180-degree return bend 137. The anti-siphon down flow conduit 126 is joined to the other end of the 180-degree return bend 137. An anti-siphon valve 135 is positioned on top of the 180-degree return bend 137. In some embodiments, the top of the 180-degree return bend 137 is 450 mm above the highest water level attainable in the holding tank. The anti-siphon valve 135 consists of a valve ball 215, a valve ball enclosure 205, and a valve ball enclosure cover 220. In some embodiments, the valve ball enclosure top 220 may be a female threaded pipe cap. An upper valve seat 217 is positioned in the top of the valve ball enclosure cover 220. The upper valve seat 217 is a round hole smaller than the diameter of the valve ball 215. The valve ball enclosure 205 may have a male threaded end. Fluid pressure supplied by the anti-siphon up flow conduit 125 drives the valve ball 215 into the upper valve seat 217 closing the anti-siphon valve 135. A lower valve seat 218 is a round hole smaller than the valve ball 215. The lower valve seat 218 is located at the apex of the 180-degree return bend 137. When no fluid is flowing up the anti-siphon up flow conduit 125, the valve ball 215 drops onto the lower valve seat 218. Around the outside perimeter of the lower valve seat 218 and the inside diameter of the valve ball enclosure 205, is a plurality of vent holes 210 piercing the apex of the 180-degree return bend 137. These vent holes 210 interrupt the siphon. The fluid will not be able to flow through the anti-siphon up flow conduit 125 and continuing through the anti-siphon down flow conduit 126.

Figure 9A:
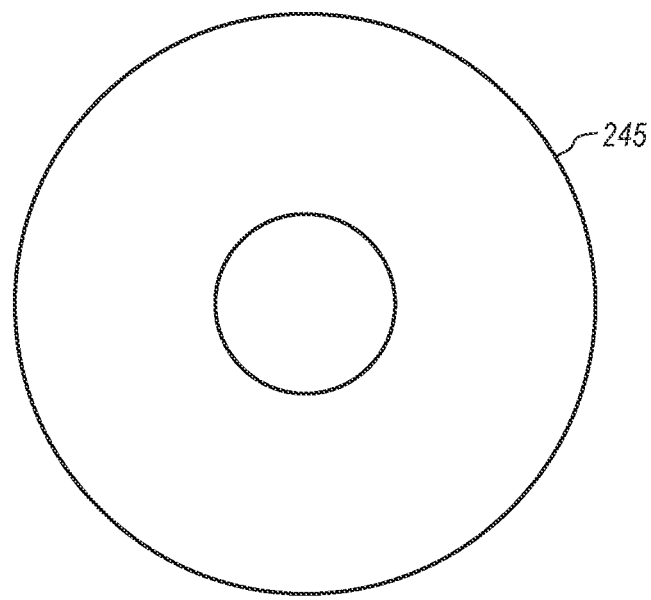
FIG. 9A is a top view of a shaft/pipe spacer 245.
Figure 9B:
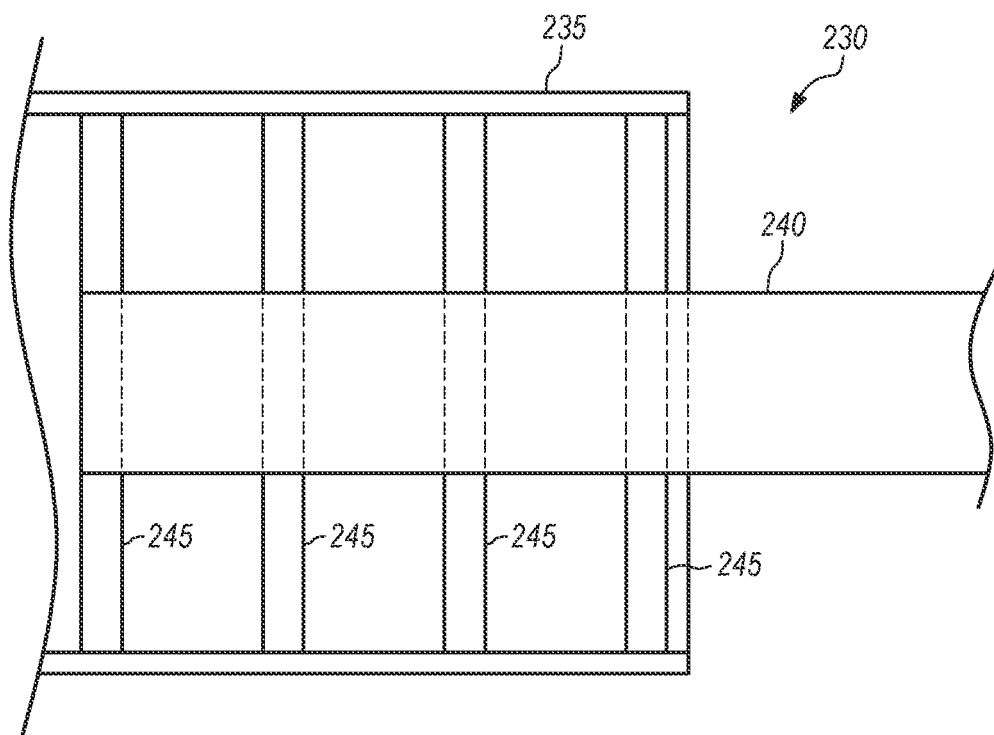
FIG. 9B is a sectional view of a shaft/pipe joint 230.

FIGS. 9A and 9B portray a method to affix one end of a shaft into a pipe. The pipe 235 has an inside diameter larger than the outside diameter of the shaft 240. This disclosure shows a method to efficiently install an end of shaft 240 inside a pipe 235 to result in a shaft/pipe joint 230. Pipes to which helixes are affixed for use in the inclined screw conveyor 82 and the agitator system 165, must have a diameter large enough to resist deflection through their operating length. Too much deflection subjects the structure of the inclined screw conveyor 82 and the agitator system 165 to operational stresses that will result in early system failure. This usually means commercially available pipes will have a much large inside diameter than the drive shafts that the rotational power means 87 and the mixing power means 195 can accommodate. The following embodiment shows a method to efficiently install an end of shaft 240 inside a pipe 235 to result in a strong and economical shaft/pipe joint 230.

As an alternative, the following embodiment describes an efficient method by which a smaller outside diameter shaft 240 may be installed in a larger inside diameter screw conveyor pipe 235. A plurality of rings 245 may be welded on the portion of the shaft 240 to be inserted inside the screw conveyor pipe 235. The rings 245 are manufactured with an inside diameter equal to the outside diameter of the shaft 240 and with an outside diameter equal to the inside diameter of the screw conveyor pipe 235, where the inside and outside diameters are those of two concentric circles. In some embodiments, the rings 245 are fabricated from 6 mm or 12 mm plate. The rings 245 are welded to the inside of the screw conveyor pipe 235 and to the outside of the shaft 240. The length of welding on the inside and outside diameters of the rings 245 is calculated based on the amount of torque needed to turn the screw conveyor pipe 235 under prescribed load.

Figure 10A:
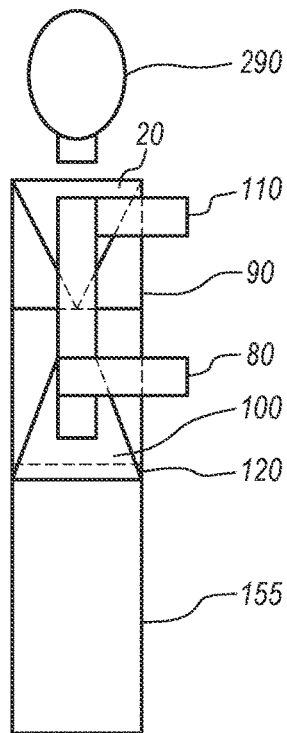
FIGS. 10A to 10F are schematic top views of six of over fifty different alternative configurations of a system 500.
Figure 10B:
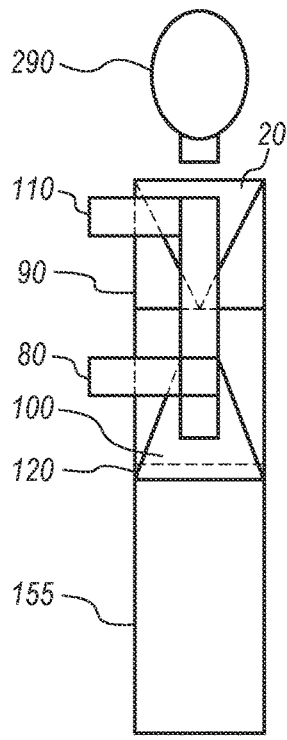
Figure 10C:
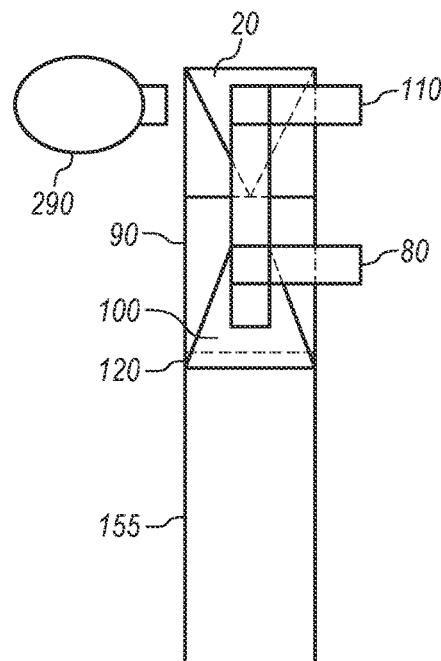
Figure 10D:
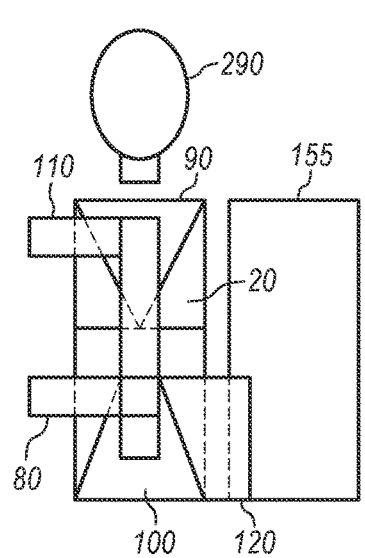
Figure 10E:
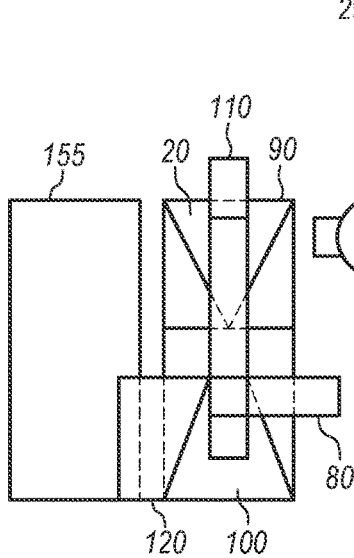
Figure 10F:
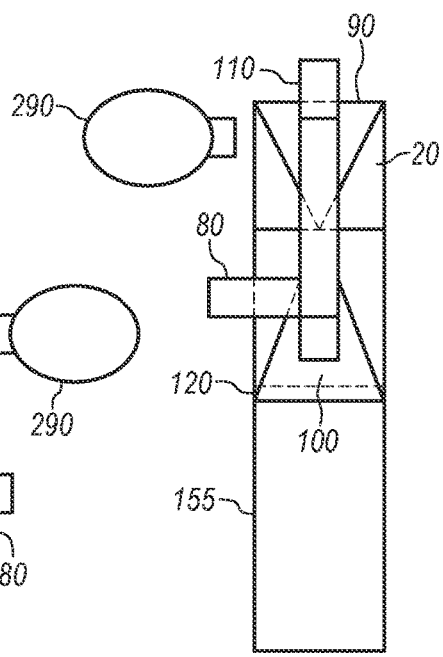

FIGS. 10A to 10F are example schematic top views of various embodiments of the System 500 out of more than fifty possible. FIG. 10A is an embodiment of the system 500 consistent with FIGS. 2 and 3. The mixer truck 290 is positioned at the receiving hopper 20 of the equipment skid 90. At the other end of the equipment skid 90, the sluiceway 120 extends over the top of the holding tank 155. The gravel discharge chute 80 and the sand discharge chute 110 discharge to the right. FIG. 10B is the same as FIG. 10A except the gravel discharge chute 80 and the sand discharge chute 110 discharge to the left. FIG. 10C follows FIG. 10A except the mixer truck 290 is discharging on the left side of the receiving hopper 20. The embodiment of FIG. 10D shows the mixer truck 290 at the receiving hopper 20 end of the skid 90. The skid 90 and the holding tank 155 are positioned side by side. The sluiceway 120 is positioned on the right side of the fluid detaining structure 100. The gravel discharge chute 80 and the sand discharge chute 110 discharge to the left. The embodiment of FIG. 10E positions the skid 90 and the holding tank 155 side by side. The mixer truck 290 is located at the right side of the receiving hopper 20. The sluiceway 120 is affixed to the left side of the fluid detaining structure 100 and extends over the top of the holding tank 155. The sand discharge chute 110 is located at the front of the skid 90. The gravel discharge chute 80 is on the right of the skid 90. FIG. 10F illustrates an embodiment of the System 500 with the sluiceway 120 located at the end of the fluid detaining structure 100 and extending over the top of the holding tank 155. The mixer truck 290 is disposed to the left side of the receiving hopper 20. The sand discharge chute 110 extends from the front of the skid 90. The gravel discharge chute 80 is located on the left side of the skid 90.

As will be appreciated by one skilled in the art, embodiments may take the form of a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Any combination of one or more computer readable storage medium(s) may be utilized. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device. Furthermore, any program instruction or code that is embodied on such computer readable storage media (including forms referred to as volatile memory) that is not a transitory signal are, for the avoidance of doubt, considered "non-transitory".

Program code embodied on a computer readable storage medium may be transmitted using any appropriate medium, including but not limited to wireless, wireline, optical fiber cable, RF, etc., or any suitable combination of the foregoing. Computer program code for carrying out various operations may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Embodiments may be described with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, and/or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored on computer readable storage media is not a transitory signal, such that the program instructions can direct a computer, other programmable data processing apparatus, or other devices to function in a particular manner, and such that the program instructions stored in the computer readable storage medium produce an article of manufacture.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to limit the scope of the claims. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the embodiment.

The corresponding structures, materials, acts, and equivalents of all means or steps plus function elements in the claims below are intended to include any structure, material, or act for performing the function in combination with other claimed elements as specifically claimed. Embodiments have been presented for purposes of illustration and description, but it is not intended to be exhaustive or limited to the embodiments in the form disclosed. Many modifications and variations will be apparent to those of ordinary skill in the art after reading this disclosure. The disclosed embodiments were chosen and described as non-limiting examples to enable others of ordinary skill in the art to understand these embodiments and other embodiments involving modifications suited to a particular implementation.

What is claimed is:

1. A method comprising:
   receiving uncured concrete slurry into a receiving hopper;
   diluting the uncured concrete slurry with pressurized water;
   pumping the diluted uncured concrete slurry from a bottom portion of the receiving hopper, wherein the diluted uncured concrete slurry becomes a watery aggregate slurry as it is pumped upward through a slurry discharge conduit, and wherein the watery aggregate slurry includes coarse aggregate, fine aggregate and ASCM entrained water;
   separating the coarse aggregate out of the watery aggregate slurry;
   after the coarse aggregate has been separated out of the watery aggregate slurry, allowing the fine aggregate to settle out of the ASCM entrained water;
   transferring the ASCM entrained water to a holding tank;
   allowing the ASCM to settle to a lower portion of the holding tank and clarified water to collect in an upper portion of the holding tank;
   agitating the settled ASCM to form liquified ASCM that is moved toward an ASCM discharge port in the lower portion of the holding tank; and
   pumping the liquified ASCM out of the holding tank through the ASCM discharge port to an ASCM discharge conduit.

2. The method of claim 1, further comprising:
discharging a known amount of the liquified ASCM through the ASCM discharge conduit into a mixer truck; and
manufacturing an uncured concrete mix in the mixer truck, wherein the uncured concrete mix includes an amount of coarse aggregate, an amount of fine aggregate, an amount of water, and an amount of Portland cement, wherein the known amount of liquified ASCM discharged into the mixer truck replaces up to 10 percent of the weight of the Portland cement that would have been included in the uncured concrete mix.

3. The method of claim 2, characterized in that the liquified ASCM discharged into the mixer truck yields a stronger and less permeable cured concrete.

4. The method of claim 3, wherein the liquified ASCM discharged into the mixer truck contains ASCM, wherein over 70 percent of the weight of the ASCM consists of oxides of calcium and silicon.

5. The method of claim 4, where a majority of the ASCM is frangible particles having a size from 5 to 20 micrometers.

6. The method of claim 1, further comprising:
providing the clarified water from the upper portion of the holding tank to the receiving hopper for use diluting the uncured concrete slurry.

7. The method of claim 1, wherein the fine aggregate settles out of the ASCM entrained water in a fluid detaining structure, and wherein the ASCM entrained water is transferred from the fluid detaining structure to the holding tank via a sluiceway.

8. The method of claim 1, wherein the uncured concrete slurry that is received into the receiving hopper is discharged from a concrete mixer truck after the concrete mixer truck has delivered a load of concrete to a job site and returned to a concrete plant site.

9. The method of claim 1, wherein the uncured concrete slurry is diluted with pressurized water that is supplied into the receiving hopper through one or more high-velocity water jets.

10. The method of claim 9, wherein the pressurized water interacts turbulently with the uncured concrete slurry.

11. The method of claim 9, wherein the pressurized water is supplied into the receiving hopper at a flow rate greater than or equal to about 300 gallons per minute to halt curing of the uncured concrete slurry.

12. The method of claim 1, wherein the fine aggregate settles out of the ASCM entrained water contained in a fluid detaining structure, further comprising:
operating an inclined screw conveyor to move fine aggregate from the bottom of the fluid detaining structure up an incline to dewater the fine aggregate and discharge the fine aggregate from the fluid detaining structure.

13. The method of claim 12, wherein the inclined screw conveyor is turned at no more than 20 rotations per minute to allow time to de-water the fine aggregate before it is discharged from the fluid detaining structure.

14. The method of claim 12, further comprising:
reusing the separated coarse aggregate and the discharged fine aggregate in a subsequent batch of uncured concrete mix.

15. The method of claim 1, wherein the coarse aggregate is separated out of the watery aggregate slurry in an aggregate separator using an inclined screen, wherein the fine aggregate and ASCM entrained water pass downward through the inclined screen and into a fluid detaining structure.

16. The method of claim 15, further comprising:
causing a velocity of the watery aggregate slurry flowing through the slurry discharge conduit to be less than a velocity of the diluted uncured concrete slurry through a port of a slurry pump coupled to the slurry discharge conduit; and
causing a velocity of the watery aggregate slurry flowing through the aggregate separator to be less than the velocity of the watery aggregate slurry flowing through the slurry discharge conduit.

17. The method of claim 1, further comprising:
supplying the clarified water under pressure to an overhead fluid supply conduit for washing the uncured concrete slurry from the mixer truck into the receiving hopper.

18. The method of claim 1, further comprising:
automatically causing agitation of the settled ASCM at least 15 seconds before allowing an ASCM pump to begin pumping the liquified ASCM out of the holding tank through the ASCM discharge port to the ASCM discharge conduit.

19. The method of claim 1, further comprising:
automatically causing agitation of the settled ASCM in response to expiration of a predetermined period of time since the last time the settled ASCM has been agitated.

* * * * *